(12) United States Patent
Shao et al.

(10) Patent No.: US 12,199,919 B2
(45) Date of Patent: *Jan. 14, 2025

(54) FEEDBACK INFORMATION TRANSMISSION METHOD AND COMMUNICATION DEVICE

(71) Applicant: HUAWEI TECHNOLOGIES CO., LTD., Shenzhen (CN)

(72) Inventors: Jiafeng Shao, Beijing (CN); Lei Guan, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,246

(22) Filed: Nov. 7, 2022

(65) Prior Publication Data

US 2023/0139850 A1 May 4, 2023

Related U.S. Application Data

(63) Continuation of application No. 16/992,046, filed on Aug. 12, 2020, now Pat. No. 11,533,150, which is a
(Continued)

(30) Foreign Application Priority Data

Feb. 13, 2018 (CN) .......................... 201810150623.5
Apr. 4, 2018 (CN) .......................... 201810302168.6

(51) Int. Cl.
*H04L 5/00* (2006.01)
*H04L 5/14* (2006.01)

(52) U.S. Cl.
CPC .......... *H04L 5/0055* (2013.01); *H04L 5/0007* (2013.01); *H04L 5/0042* (2013.01); *H04L 5/0082* (2013.01); *H04L 5/1469* (2013.01)

(58) Field of Classification Search
CPC ... H04L 5/0055; H04L 5/0007; H04L 5/0042; H04L 5/0082; H04L 5/1469;
(Continued)

(56) References Cited

U.S. PATENT DOCUMENTS

2012/0033575 A1 2/2012 Zhang et al.
2012/0039280 A1 2/2012 Chen et al.
(Continued)

FOREIGN PATENT DOCUMENTS

CN 101615979 A 12/2009
CN 101867464 A 10/2010
(Continued)

OTHER PUBLICATIONS

U.S. Appl. No. 16/992,046, filed Aug. 12, 2020.
(Continued)

*Primary Examiner* — Sharmin Chowdhury
(74) *Attorney, Agent, or Firm* — Leydig, Voit & Mayer, Ltd.

(57) ABSTRACT

A method is provided to improve resource utilization efficiency of an uplink control channel carrying feedback information, including: a terminal device receives one or more downlink channels carried in one or more first time units, which belong to a time unit set; determines a second time unit for carrying feedback information corresponding to the downlink channels according to a first association relationship between the time unit set and the second time unit; and sends uplink control information including a determined first codebook in the second time unit. When a downlink channel is received in first time units that belong to a subset of the time unit set, and there is a second association relationship between the subset of the time unit set and the second time unit, the first codebook includes only
(Continued)

feedback information corresponding to the downlink channel carried in the first time units in the subset.

17 Claims, 7 Drawing Sheets

Related U.S. Application Data continuation of application No. PCT/CN2019/072888, filed on Jan. 24, 2019.

(58) Field of Classification Search
CPC .. H04L 1/1854; H04L 1/1861; H04W 72/042; H04W 72/0446; H04W 72/0453
See application file for complete search history.

(56) References Cited

U.S. PATENT DOCUMENTS

| | | | |
|---|---|---|---|
| 2012/0155337 A1 | 6/2012 | Park | |
| 2015/0156768 A1 | 6/2015 | Guan et al. | |
| 2016/0302183 A1 | 10/2016 | Yang et al. | |
| 2017/0118745 A1 | 4/2017 | Nogami et al. | |
| 2017/0331596 A1 | 11/2017 | Guan et al. | |
| 2019/0363840 A1* | 11/2019 | Wang | H04L 1/1864 |
| 2019/0363842 A1 | 11/2019 | Fu et al. | |
| 2020/0344737 A1 | 10/2020 | Takeda et al. | |
| 2021/0050948 A1* | 2/2021 | Gao | H04L 1/1812 |

FOREIGN PATENT DOCUMENTS

| | | |
|---|---|---|
| CN | 102104460 A | 6/2011 |
| CN | 103188827 A | 7/2013 |
| CN | 104471999 A | 3/2015 |
| CN | 105052048 A | 11/2015 |
| CN | 105337651 A | 2/2016 |
| CN | 106105078 A | 11/2016 |
| CN | 107332646 A | 11/2017 |
| CN | 107359969 A | 11/2017 |
| CN | 107370570 A | 11/2017 |
| CN | 107615697 B | 8/2020 |
| EP | 2230786 A1 | 9/2010 |
| WO | 2013015606 A3 | 4/2013 |
| WO | 2015115454 A1 | 8/2015 |
| WO | 2016119221 A1 | 8/2016 |
| WO | 2016123372 A1 | 8/2016 |
| WO | 2017024532 A1 | 2/2017 |

OTHER PUBLICATIONS

3GPP TSG RAN WG1 Meeting 91, R1-1720826: "Remaining issues on other aspect of carrier aggregation", NTT Docomo, Inc., Reno, USA, Nov. 27-Dec. 1, 2017, total 9 pages.

NTT Docomo Inc., "DL/UL scheduling and HARQ management", 3GPP TSG RAN WG1 Meeting AH 1801 R1-1800676, 26 (Jan. 26, 2018), total 6 pages.

3GPP TS 38.213 V15.0.0: "3rd Generation Partnership Project; Technical Specification Group Radio Access Network; NR; Physical layer procedures for control (Release 15)", Dec. 2017, total 56 pages.

3GPP TS 38.331 V15.0.0: "3rd Generation Partnership Project; Technical Specification Group Radio Access Network NR Radio Resource Control (RRC) protocol specification (Release 15)", Dec. 2017, total 188 pages.

3GPP TS 38.214 V15.0.0: 3rd Generation Partnership Project; Technical Specification Group Radio Access Network; NR; Physical layer procedures for data (Release 15) Dec. 2017 total 71 pages.

3GPP TSG-RAN WG1 AH1801, R1-1801163: "Offline on CA", Samsung, Vancouver, Canada, Jan. 22-26, 2018, total 2 pages.

3GPP TSG RAN WG1 Meeting #92bis, R1-1803698: "Discussion on semi-static HARQ-ACK codebook for slot aggregation", Huawei, HiSilicon, Sanya, China, Apr. 16-Apr. 20, 2018, total 6 pages.

* cited by examiner

FEEDBACK INFORMATION TRANSMISSION METHOD AND COMMUNICATION DEVICE

CROSS-REFERENCE TO RELATED APPLICATIONS

This application is a continuation of U.S. application Ser. No. 16/992,046, filed on Aug. 12, 2020, now U.S. Pat. No. 11,533,150, which is a continuation of International Patent Application No. PCT/CN2019/072888, filed on Jan. 24, 2019, which claims priority to Chinese Patent Application No. 201810150623.5, filed on Feb. 13, 2018, and Chinese Patent Application No. 201810302168.6, filed on Apr. 4, 2018. All of the aforementioned patent applications are incorporated by reference in their entireties.

TECHNICAL FIELD

Embodiments of this application relate to the communication field, and more specifically, to a feedback information transmission method and a communication device.

BACKGROUND

Long term evolution (LTE) systems support semi-persistent codebook configuration. A codebook is determined based on the number of downlink subframes in a semi-persistent downlink subframe set. For example, a codebook of acknowledgment (ACK)/negative acknowledgment (NACK) information includes feedback information corresponding to all downlink subframes in a semi-persistent downlink subframe set. The downlink subframes include downlink subframes for an actually scheduled physical downlink shared channel (PDSCH) or downlink subframes for semi-persistent scheduling (SPS) release indication, and may also include unscheduled downlink subframes. An NACK is set in a position of the codebook corresponding to an unscheduled downlink subframe or a downlink subframe which scheduling signaling is not received by a terminal device.

In existing LTE systems, fallback scheduling and codebook fallback are supported for semi-persistent codebook configuration. Future fifth generation (5G) communication systems are different from the LTE systems. Therefore, how to implement codebook fallback and fallback scheduling mechanisms in the 5G systems to improve resource utilization efficiency of an uplink control channel that carries feedback information becomes a technical problem that needs to be resolved in the 5G systems.

SUMMARY

Embodiments of this application provide a feedback information transmission method and a communication device, so as to improve resource utilization efficiency of an uplink control channel that carries feedback information.

According to a first aspect, a feedback information transmission method is provided. The method includes: receiving, by a terminal device, at least one piece of downlink information in at least one first time unit in a time unit set, where the time unit set is a set of at least one first time unit corresponding to at least one frequency domain unit configured for the terminal device;

determining, by the terminal device, a second time unit, where the second time unit is used to carry feedback information corresponding to the at least one piece of downlink information, and there is a first association relationship between the time unit set and the second time unit;

determining, by the terminal device, a first codebook, where when first downlink information in a time unit subset meets a preset condition, the first codebook includes feedback information corresponding to the first downlink information, the first codebook does not include feedback information corresponding to a specific time unit in the time unit subset, the specific time unit is at least one first time unit in the time unit set other than a first time unit in which the first downlink information is located, the preset condition includes a first condition, the first condition is that the number of pieces of first downlink information is equal to a first preset value, the time unit subset is a subset of the time unit set, and there is a second association relationship between the time unit subset and the second time unit; and sending, by the terminal device, uplink control information in the second time unit, where the uplink control information carries the first codebook.

If the terminal device schedules a plurality of pieces of downlink information in a plurality of time units in the time unit set corresponding to the first association relationship, when the number of pieces of downlink information corresponding to the second association relationship meets the first condition, codebook fallback can be performed, thereby improving efficiency of utilizing, by a system, a resource of an uplink control channel that carries feedback information.

With reference to the first aspect, in some implementations of the first aspect, the preset condition further includes a second condition, and the second condition is that a value of indication information on a downlink control channel for dynamically scheduling the first downlink information is a second preset value.

Optionally, the second preset value may be a downlink assignment indicator (DAI) value.

With reference to the first aspect, in some implementations of the first aspect, the preset condition further includes a third condition, and the third condition is that the first time unit in which the first downlink information is located is a first time unit in a specific time domain location in the time unit set.

With reference to the first aspect, in some implementations of the first aspect, the preset condition further includes a fourth condition, and the fourth condition is that the first downlink information is carried in a primary frequency domain unit or a first secondary frequency domain unit in the at least one frequency domain unit.

With reference to the first aspect, in some implementations of the first aspect, the preset condition may further include any one or more of the second condition, the third condition, and the fourth condition in addition to the first condition. For example, the preset condition further includes the second condition and the third condition in addition to the first condition. Alternatively, the preset condition further includes the second condition and the fourth condition in addition to the first condition. This is not limited in this application.

With reference to the first aspect, in some implementations of the first aspect, when the number of pieces of the first downlink information in the time unit subset does not meet the first condition, the first codebook includes feedback information corresponding to all first time units in the time unit set.

With reference to the first aspect, in some implementations of the first aspect, the value of the indication information is set according to a predefined rule related to the time unit subset.

With reference to the first aspect, in some implementations of the first aspect, for at least one first time unit that corresponds to each of the at least one frequency domain unit and that is in the first time unit subset, the predefined rule is performing cumulative counting in a sequential order of time units; or for at least one first time unit that corresponds to the at least one frequency domain unit and that is in the first time unit subset, the predefined rule is performing cumulative counting first in a frequency-domain order and then in a time-domain order.

A problem of inconsistent understanding between the terminal device and a network device that may be caused due to codebook fallback may be resolved through independent DAI cumulative counting in the time unit subset.

With reference to the first aspect, in some implementations of the first aspect, the at least one piece of downlink information further includes second downlink information, where a downlink control channel for scheduling the second downlink information is a downlink control channel for semi-persistent scheduling, and the first codebook further includes feedback information corresponding to the second downlink information.

With reference to the first aspect, in some implementations of the first aspect, the first association relationship is predefined according to a standard and/or configured for the terminal device by a network device by using radio resource control (RRC) signaling.

With reference to the first aspect, in some implementations of the first aspect, the second association relationship is determined based on the downlink control channel for dynamically scheduling the first downlink information.

With reference to the first aspect, in some implementations of the first aspect, before the determining, by the terminal device, a first codebook, the method further includes:

determining, by the terminal device, a semi-persistent codebook mode from a plurality of candidate codebook modes, where the plurality of candidate codebook modes include a semi-persistent codebook mode and a dynamic codebook mode.

With reference to the first aspect, in some implementations of the first aspect, the first preset value is greater than or equal to 1, and when the first preset value is greater than 1, first downlink information whose number of pieces is equal to the first preset value carries same transport block information.

With reference to the first aspect, in some implementations of the first aspect, the first downlink information whose number of pieces is equal to the first preset value is scheduled by one downlink control channel.

With reference to the first aspect, in some implementations of the first aspect, the first preset value is less than or equal to a third preset value, and the third preset value is determined based on a downlink aggregation parameter configured by using higher layer signaling.

According to a second aspect, a feedback information transmission method is provided. The method includes: sending, by a network device, at least one piece of downlink information to a terminal device in at least one first time unit in a time unit set, where the time unit set is a set of at least one first time unit corresponding to at least one frequency domain unit configured for the terminal device;

determining, by the network device, a second time unit, where the second time unit is used to carry feedback information corresponding to the at least one piece of downlink information, and there is a first association relationship between the time unit set and the second time unit; and receiving, by the network device in the second time unit, uplink control information sent by the terminal device, where the uplink control information carries a first codebook, the first codebook is a first codebook when first downlink information in a time unit subset meets a preset condition, the first codebook includes feedback information corresponding to the first downlink information, the first codebook does not include feedback information corresponding to a specific time unit in the time unit subset, the specific time unit is at least one first time unit in the time unit set other than a first time unit in which the first downlink information is located, the preset condition includes a first condition, the first condition is that the number of pieces of first downlink information is equal to a first preset value, the time unit subset is a subset of the time unit set, and there is a second association relationship between the time unit subset and the second time unit.

The network device receives the first codebook sent by the terminal device. When the first downlink information in the time unit subset meets the preset condition, codebook fallback is performed for the first codebook, thereby improving efficiency of utilizing, by a system, a resource of an uplink control channel that carries feedback information.

With reference to the second aspect, in some implementations of the second aspect, the preset condition further includes a second condition, and the second condition is that a value of indication information on a downlink control channel for dynamically scheduling the first downlink information is a second preset value.

With reference to the second aspect, in some implementations of the second aspect, the preset condition further includes a third condition, and the third condition is that the first time unit in which the first downlink information is located is a first time unit in a specific time domain location in the time unit set.

With reference to the second aspect, in some implementations of the second aspect, the preset condition further includes a fourth condition, and the fourth condition is that the first downlink information is carried in a primary frequency domain unit or a first secondary frequency domain unit in the at least one frequency domain unit.

With reference to the second aspect, in some implementations of the second aspect, the preset condition may further include any one or more of the second condition, the third condition, and the fourth condition in addition to the first condition. For example, the preset condition further includes the second condition and the third condition in addition to the first condition. Alternatively, the preset condition further includes the second condition and the fourth condition in addition to the first condition. This is not limited in this application.

With reference to the second aspect, in some implementations of the second aspect, when the number of pieces of the first downlink information in the time unit subset does not meet the first condition, the first codebook includes feedback information corresponding to all first time units in the time unit set.

With reference to the second aspect, in some implementations of the second aspect, the value of the indication information is set according to a predefined rule related to the time unit subset.

With reference to the second aspect, in some implementations of the second aspect, for at least one first time unit that corresponds to each of the at least one frequency domain unit and that is in the first time unit subset, the predefined rule is performing cumulative counting in a sequential order of time units; or for at least one first time unit that corresponds to the at least one frequency domain unit and that is in the first time unit subset, the predefined rule is performing cumulative counting first in a frequency-domain order and then in a time-domain order.

A problem of inconsistent understanding between the terminal device and the network device that may be caused due to codebook fallback may be resolved through independent DAI cumulative counting in the time unit subset.

With reference to the second aspect, in some implementations of the second aspect, the at least one piece of downlink information further includes second downlink information, where a downlink control channel for scheduling the second downlink information is a downlink control channel for semi-persistent scheduling, and the first codebook further includes feedback information corresponding to the second downlink information.

With reference to the second aspect, in some implementations of the second aspect, the first association relationship is predefined according to a standard and/or configured for the terminal device by the network device by using RRC signaling.

With reference to the second aspect, in some implementations of the second aspect, the second association relationship is indicated by the downlink control channel for dynamically scheduling the first downlink information.

With reference to the second aspect, in some implementations of the second aspect, before the receiving, by the network device in the second time unit, uplink control information sent by the terminal device, the method further includes:
  determining, by the network device, a semi-persistent codebook mode from a plurality of candidate codebook modes, where the plurality of candidate codebook modes include a semi-persistent codebook mode and a dynamic codebook mode; and
  configuring, by the network device, the semi-persistent codebook mode for the terminal device by using signaling.

With reference to the second aspect, in some implementations of the second aspect, the first preset value is greater than or equal to 1, and when the first preset value is greater than 1, first downlink information whose number of pieces is equal to the first preset value carries same transport block information.

With reference to the second aspect, in some implementations of the second aspect, the first downlink information whose number of pieces is equal to the first preset value is scheduled by one downlink control channel.

With reference to the second aspect, in some implementations of the second aspect, the first preset value is less than or equal to a third preset value, and the third preset value is determined based on a downlink aggregation parameter configured by using higher layer signaling.

With reference to the first aspect and the second aspect, in some possible implementations, the at least one piece of downlink information is downlink information of dynamic scheduling, and specifically, may include semi-persistent scheduling (SPS) release indication or a dynamically scheduled downlink data channel. A dynamically scheduled downlink data channel is dynamically scheduled through a downlink control channel, where dynamic scheduling means that each transmission of a downlink data channel needs to be scheduled through a corresponding downlink control channel.

A semi-persistently scheduled downlink data channel is scheduled through a semi-persistent downlink control channel. After control information is sent once through the semi-persistent downlink control channel, a corresponding semi-persistent downlink data channel may be always sent according to a preconfigured sending cycle, with no need to send the semi-persistent downlink control channel each time. Semi-persistent downlink scheduling may be released through a specific downlink control channel. A downlink control channel used to implement release indication of the semi-persistent downlink scheduling is usually not used to schedule a downlink data channel. However, the terminal device also needs to feed back ACK/NACK feedback information for the downlink control channel.

With reference to the first aspect or the second aspect, in some possible implementations, a time unit may be at least one of a slot, a mini-slot, and a subframe.

With reference to the first aspect or the second aspect, in some possible implementations, a frequency domain unit may be a carrier or a carrier bandwidth part (BWP).

With reference to the first aspect or the second aspect, in some possible implementations, the first time unit is a downlink time unit or a flexible time unit.

With reference to the first aspect or the second aspect, in some possible implementations, the second time unit is an uplink time unit or a flexible time unit.

With reference to the first aspect or the second aspect, in some possible implementations, a downlink control channel for fallback scheduling has at least one of the following characteristics:
  the downlink control channel is used for data scheduling performed before RRC establishment; and none of values of all fields in the control channel, for example, a time domain resource allocation field, a DAI field, and a BWP indication field, may be configured by using RRC dedicated signaling.

With reference to the first aspect or the second aspect, in some possible implementations, the terminal device may be configured to detect a downlink control channel for non-fallback scheduling. The control channel has at least one of the following characteristics:
  the downlink control channel is used for data scheduling performed after RRC establishment; and a value of at least one field in the control channel, for example, a time domain resource allocation field, a DAI field, and a BWP indication field, may be configured by using RRC dedicated signaling.

With reference to the first aspect or the second aspect, in some possible implementations, first indication information included on the downlink control channel for dynamically scheduling the first downlink information is a DAI field, and the preset value is preferably DAI=1 or a value indicated by a state '00' of the DAI field.

With reference to the first aspect or the second aspect, in some possible implementations, in the dynamic codebook mode, the terminal device determines a second codebook of feedback information, where the second codebook includes feedback information corresponding to an actually scheduled first time unit in the time unit set.

With reference to the first aspect or the second aspect, in some possible implementations, before the terminal device sends the feedback information in the second time unit based on the first codebook, the terminal device determines a target resource set of an uplink control channel, and determines a target resource of the uplink control channel from the target resource set. The terminal device sends the uplink control information on the target resource in the second time unit, where the uplink control information carries the first codebook.

With reference to the first aspect or the second aspect, in some possible implementations, for example, when the number of pieces of the first downlink information in the at least one piece of downlink information is equal to the first preset value (for example, the first preset value is 1) or when the foregoing other conditions are met, that is, the first codebook in this case is a fallback codebook, the target resource set is a first resource set, and a codebook size of the first codebook corresponding to the first resource set is less than or equal to 2.

With reference to the first aspect or the second aspect, in some possible implementations, when the number of pieces of the first downlink information in the at least one piece of downlink information is not the first preset value, the target resource set is a second resource set, and a codebook size of the first codebook corresponding to the second resource set is greater than 2. In this case, the first codebook is a non-fallback codebook or a normal semi-persistent codebook. In this case, the terminal device sends the first codebook of the feedback information on a second target resource in the second resource set.

According to a third aspect, a communication device for transmitting feedback information is provided The device includes: a transceiver unit, configured to receive at least one piece of downlink information in at least one first time unit in a time unit set, where the time unit set is a set of at least one first time unit corresponding to at least one frequency domain unit configured for a terminal device; and a processing unit, configured to determine a second time unit, where the second time unit is used to carry feedback information corresponding to the at least one piece of downlink information, and there is a first association relationship between the time unit set and the second time unit; and configured to determine a first codebook, where when first downlink information in a time unit subset meets a preset condition, the first codebook includes feedback information corresponding to the first downlink information, the first codebook does not include feedback information corresponding to a specific time unit in the time unit subset, the specific time unit is at least one first time unit in the time unit set other than a first time unit in which the first downlink information is located, the preset condition includes a first condition, the first condition is that the number of pieces of first downlink information is equal to a first preset value, the time unit subset is a subset of the time unit set, and there is a second association relationship between the time unit subset and the second time unit; where the transceiver unit is configured to send uplink control information in the second time unit, where the uplink control information carries the first codebook.

In a semi-persistent codebook mode, when the communication device for transmitting feedback information schedules a plurality of pieces of downlink information in at least one time unit for sending the feedback information, specifically, in a plurality of time units in the time unit set corresponding to the first association relationship, when the number of pieces of downlink information corresponding to the second association relationship meets the first condition, codebook fallback can be performed, thereby improving efficiency of utilizing, by a system, a resource of an uplink control channel that carries feedback information.

With reference to the third aspect, in some implementations of the third aspect, the preset condition further includes a second condition, and the second condition is that a value of indication information on a downlink control channel for dynamically scheduling the first downlink information is a second preset value.

With reference to the third aspect, in some implementations of the third aspect, the preset condition further includes a third condition, and the third condition is that the first time unit in which the first downlink information is located is a first time unit in a specific time domain location in the time unit set.

With reference to the third aspect, in some implementations of the third aspect, the preset condition further includes a fourth condition, and the fourth condition is that the first downlink information is carried in a primary frequency domain unit or a first secondary frequency domain unit in the at least one frequency domain unit.

With reference to the third aspect, in some implementations of the third aspect, when the number of pieces of the first downlink information in the time unit subset does not meet the first condition, the first codebook includes feedback information corresponding to all first time units in the time unit set.

With reference to the third aspect, in some implementations of the third aspect, the value of the indication information is set according to a predefined rule related to the time unit subset.

With reference to the third aspect, in some implementations of the third aspect, for at least one first time unit that corresponds to each of the at least one frequency domain unit and that is in the first time unit subset, the predefined rule is performing cumulative counting in a sequential order of time units; or for at least one first time unit that corresponds to the at least one frequency domain unit and that is in the first time unit subset, the predefined rule is performing cumulative counting first in a frequency-domain order and then in a time-domain order.

A problem of inconsistent understanding between the terminal device and a network device that may be caused due to codebook fallback may be resolved through independent DAI cumulative counting in the time unit subset.

With reference to the third aspect, in some implementations of the third aspect, the at least one piece of downlink information further includes second downlink information, where a downlink control channel for scheduling the second downlink information is a downlink control channel for semi-persistent scheduling, and the first codebook further includes feedback information corresponding to the second downlink information.

With reference to the third aspect, in some implementations of the third aspect, the first association relationship is predefined according to a standard and/or configured for the terminal device by a network device by using RRC signaling.

With reference to the third aspect, in some implementations of the third aspect, the second association relationship is determined based on the downlink control channel for dynamic scheduling.

With reference to the third aspect, in some implementations of the third aspect, the processing unit is further configured to determine a semi-persistent codebook mode from a plurality of candidate codebook modes, where the plurality of candidate codebook modes include a semi-persistent codebook mode and a dynamic codebook mode.

With reference to the third aspect, in some implementations of the third aspect, the first preset value is greater than or equal to 1, and when the first preset value is greater than 1, first downlink information whose number of pieces is equal to the first preset value carries same transport block information.

With reference to the third aspect, in some implementations of the third aspect, the first downlink information whose number of pieces is equal to the first preset value is scheduled by one downlink control channel.

With reference to the third aspect, in some implementations of the third aspect, the first preset value is less than or equal to a third preset value, and the third preset value is determined based on a downlink aggregation parameter configured by using higher layer signaling.

According to a fourth aspect, a communication device for transmitting feedback information is provided. The device includes: a transceiver unit, configured to send at least one piece of downlink information to a terminal device in at least one first time unit in a time unit set, where the time unit set is a set of at least one first time unit corresponding to at least one frequency domain unit configured for the terminal device; and a processing unit, configured to determine a second time unit, where the second time unit is used to carry feedback information corresponding to the at least one piece of downlink information, and there is a first association relationship between the time unit set and the second time unit; where the transceiver unit is configured to receive, in the second time unit, uplink control information sent by the terminal device, where the uplink control information carries a first codebook, the first codebook is a first codebook when first downlink information in a time unit subset meets a preset condition, the first codebook includes feedback information corresponding to the first downlink information, the first codebook does not include feedback information corresponding to a specific time unit in the time unit subset, the specific time unit is at least one first time unit in the time unit set other than a first time unit in which the first downlink information is located, the preset condition includes a first condition, the first condition is that the number of pieces of first downlink information is equal to a first preset value, the time unit subset is a subset of the time unit set, and there is a second association relationship between the time unit subset and the second time unit.

A network device receives the first codebook sent by the terminal device. When the first downlink information in the time unit subset meets the preset condition, codebook fallback is performed for the first codebook, thereby improving efficiency of utilizing, by a system, a resource of an uplink control channel that carries feedback information.

With reference to the fourth aspect, in some implementations of the fourth aspect, the preset condition further includes a second condition, and the second condition is that a value of indication information on a downlink control channel for dynamically scheduling the first downlink information is a second preset value.

With reference to the fourth aspect, in some implementations of the fourth aspect, the preset condition further includes a third condition, and the third condition is that the first time unit in which the first downlink information is located is a first time unit in a specific time domain location in the time unit set.

With reference to the fourth aspect, in some implementations of the fourth aspect, the preset condition further includes a fourth condition, and the fourth condition is that the first downlink information is carried in a primary frequency domain unit or a first secondary frequency domain unit in the at least one frequency domain unit.

With reference to the fourth aspect, in some implementations of the fourth aspect, when the number of pieces of the first downlink information in the time unit subset does not meet the first condition, the first codebook includes feedback information corresponding to all first time units in the time unit set.

With reference to the fourth aspect, in some implementations of the fourth aspect, the value of the indication information is set according to a predefined rule related to the time unit subset.

With reference to the fourth aspect, in some implementations of the fourth aspect, for at least one first time unit that corresponds to each of the at least one frequency domain unit and that is in the first time unit subset, the predefined rule is performing cumulative counting in a sequential order of time units; or for at least one first time unit that corresponds to the at least one frequency domain unit and that is in the first time unit subset, the predefined rule is performing cumulative counting first in a frequency-domain order and then in a time-domain order.

A problem of inconsistent understanding between the terminal device and the network device that may be caused due to codebook fallback may be resolved through independent DAI cumulative counting in a time unit subset.

With reference to the fourth aspect, in some implementations of the fourth aspect, the at least one piece of downlink information further includes second downlink information, where a downlink control channel for scheduling the second downlink information is a downlink control channel for semi-persistent scheduling, and the first codebook further includes feedback information corresponding to the second downlink information.

With reference to the fourth aspect, in some implementations of the fourth aspect, the first association relationship is predefined according to a standard and/or configured for the terminal device by the network device by using RRC signaling.

With reference to the fourth aspect, in some implementations of the fourth aspect, the second association relationship is indicated by the downlink control channel for dynamically scheduling the first downlink information.

With reference to the fourth aspect, in some implementations of the fourth aspect, the processing unit is further configured to:

determine a semi-persistent codebook mode from a plurality of candidate codebook modes, where the plurality of candidate codebook modes include a semi-persistent codebook mode and a dynamic codebook mode; and the transceiver unit is further configured to configure the semi-persistent codebook mode for the terminal device by using signaling.

With reference to the fourth aspect, in some implementations of the fourth aspect, the first preset value is greater than or equal to 1, and when the first preset value is greater than 1, first downlink information whose number of pieces is equal to the first preset value carries same transport block information.

With reference to the fourth aspect, in some implementations of the fourth aspect, the first downlink information whose number of pieces is equal to the first preset value is scheduled by one downlink control channel.

With reference to the fourth aspect, in some implementations of the fourth aspect, the first preset value is less than or equal to a third preset value, and the third preset value is determined based on a downlink aggregation parameter configured by using higher layer signaling.

According to a fifth aspect, a communication device for transmitting feedback information is provided. The device includes a memory and a processor, where the memory is configured to store a computer program, and the processor is configured to invoke and run the computer program in the memory, so that the communication device performs either the method in the first aspect and the implementations of the first aspect or the method in the second aspect and the implementations of the second aspect.

According to a sixth aspect, a communication system is provided, where the system includes the communication device in the third aspect or any possible implementation of the third aspect and the communication device in the fourth aspect or any possible implementation of the fourth aspect.

According to a seventh aspect, a chip system is provided, including a memory and a processor, where the memory is configured to store a computer program, and the processor is configured to invoke and run the computer program in the memory, so that a communication device provided with the chip system performs either the method in the first aspect and the implementations of the first aspect or the method in the second aspect and the implementations of the second aspect.

According to an eighth aspect, a computer program product is provided, where the computer program product includes computer program code, and when the computer program code is run by a communication unit and a processing unit or a transceiver and a processor that are of a communication device (for example, a terminal device or a network device), the communication device is enabled to perform either the method in the first aspect and the implementations of the first aspect or the method in the second aspect and the implementations of the second aspect.

According to a ninth aspect, a computer-readable storage medium is provided, where the computer-readable storage medium stores a program, and the program enables a communication device (for example, a terminal device or a network device) to perform either the method in the first aspect and the implementations of the first aspect or the method in the second aspect and the implementations of the second aspect.

DETAILED DESCRIPTION

Figure 1:
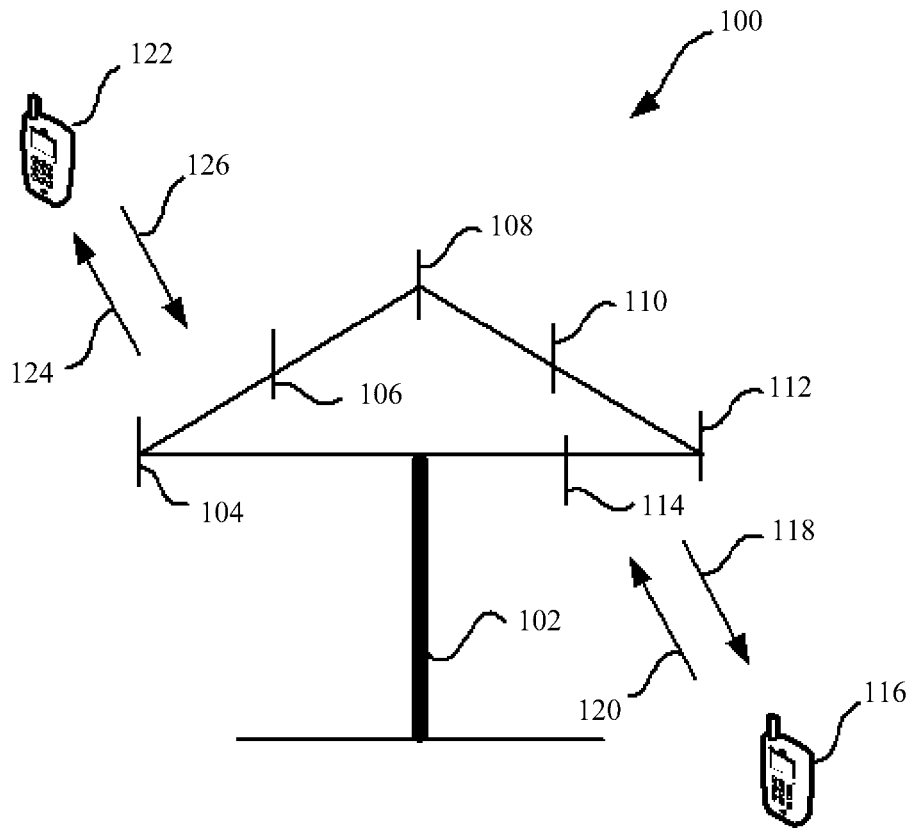
FIG. 1 is a schematic diagram of a communication system.

The following describes technical solutions provided by embodiments of this application with reference to accompanying drawings.

The technical solutions in the embodiments of this application may be applied to various communication systems, such as global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications service (UMTS) systems, worldwide interoperability for microwave access (WiMAX) communications systems, future 5th Generation (5G) systems, or new radio (NR) systems.

A terminal device in the embodiments of this application may correspond to various devices in technical literature, such as user equipment, an access terminal, a subscriber unit, a subscriber station, a mobile station, a mobile console, a remote station, a remote terminal, a mobile device, a user terminal, a terminal, a wireless communication device, a user agent, or a user communication device. The terminal device may alternatively be referred to as a cellular phone, a cordless phone, a session initiation protocol (SIP) phone, a wireless local loop (WLL) station, a personal digital assistant (PDA), a handheld device, a computing device having a wireless communication function, a processing device connected to a wireless modem, a vehicle-mounted device, a terminal device in a future 5G network, a terminal device in a future evolved public land mobile network (PLMN), or the like. This is not limited in the embodiments of this application.

Further, in the embodiments of this application, the terminal device may alternatively be a wearable device. The wearable device may also be referred to as a wearable intelligent device, and is a general term for wearable devices, for example, glasses, gloves, watches, clothing, and shoes, that are developed through intelligent design for daily wearables by using a wearable technology. The wearable device is a portable device that is worn directly on the body or integrated into a user's clothing or accessory. A wearable device is not only a hardware device, but also implements powerful functions through software support, data exchange, and cloud-based interaction. In a broad sense, a wearable intelligent device includes a device that provides a complete function, has a large size, and can implement all or some functions without relying on a smartphone, for example, a smartwatch or smart glasses; and includes a device that focuses only on a specific type of application function and that needs to be used in combination with another device such as a smartphone, for example, various smart bands and smart jewelry used for vital sign monitoring.

In addition, in the embodiments of this application, the terminal device may alternatively be a terminal device in an Internet of Things (IoT) system. IoT is an important part of future development of information technologies, and a main technical feature of IoT is to connect an object to a network by using communication technologies, thereby implementing an intelligent network for interconnection between a person and a machine or between one object and another.

In the embodiments of this application, the IoT technology can implement massive connections, in-depth coverage, and power saving for terminals by using, for example, a narrow band (NB) technology. For example, an NB resource includes only one resource block (RB). In other words, a bandwidth of the NB is only 180 KB. To implement massive connections, terminals need to perform discrete access. With communication methods according to the embodiments of this application, a congestion problem that occurs when massive terminals access a network based on NB by using the IoT technology can be effectively resolved.

In the embodiments of this application, a network device may be an access network device or a core network device.

The access network device may be a device configured to communicate with a terminal device. The access network device may be an access point (AP) in a wireless local area network (WLAN), a base transceiver station (BTS) in GSM or CDMA, a NodeB (NB) in wideband code division multiple access (WCDMA), a gNB in a new radio (NR) system, an evolved NodeB (eNB or eNodeB) in LTE, a relay node, an access point, a vehicle-mounted device, a wearable device, an access network device in a future 5G network, an access network device in a future evolved PLMN network, or the like.

The access network device provides a service for a cell, and the terminal device communicates with the access network device by using a transmission resource (for example, a frequency domain resource or a spectrum resource) used by the cell. The cell may be a cell corresponding to the access network device (for example, a base station). The cell may belong to a macro base station or a base station corresponding to a small cell. The small cell herein may include a metro cell, a micro cell, a pico cell, a femto cell, or the like. These small cells feature small coverages and low transmission power, and are suitable for providing high-rate data transmission services.

In addition, on a carrier in an LTE system or a 5G system, a plurality of cells may work at one frequency. In some special scenarios, it may also be considered that a concept of a carrier is equivalent to a concept of a cell. For example, in a carrier aggregation (CA) scenario, when a secondary component carrier is configured for a terminal device, a configuration carries both a carrier index of the secondary component carrier and a cell identity (Cell ID) of a secondary serving cell working on the secondary component carrier. In this case, it may be considered that the concept of carrier is equivalent to the concept of cell. For example, that a terminal device accessing a carrier is equivalent to the terminal device accessing a cell.

The core network device may be connected to a plurality of access network devices, configured to control the access network devices, and can distribute data received from a network side (for example, the Internet) to the access network devices.

It should be understood that the foregoing listed functions and specific implementations of the terminal device, the access network device, and the core network device are merely examples, and this application is not limited thereto.

FIG. 1 is a schematic diagram of a system 100 to which a communication method provided in an embodiment of this application may be applied. As shown in FIG. 1, the system 100 includes a network device 102, and the network device 102 may include one or more antennas, for example, antennas 104, 106, 108, 110, 112, and 114. In addition, the network device 102 may additionally include a transmitter chain and a receiver chain. The transmitter chain and the receiver chain each may include a plurality of components related to signal transmission and reception (such as a processor, a modulator, a multiplexer, a demodulator, a demultiplexer, or an antenna).

The network device 102 may communicate with a plurality of terminal devices (for example, a terminal device 116 and a terminal device 122). However, it can be understood that the network device 102 may communicate with any number of terminal devices similar to the terminal device 116 or the terminal device 122. The terminal devices 116 and 122 may be, for example, cellular phones, smartphones, portable computers, handheld communication devices, handheld computing devices, satellite radio communication devices, global positioning systems, PDAs, and/or any other appropriate devices that are configured to perform communication in the system 100.

As shown in FIG. 1, the terminal device 116 communicates with the antennas 112 and 114. The antennas 112 and 114 send information to the terminal device 116 through a forward link (which may also be referred to as a downlink) 118, and receive information from the terminal device 116 through a reverse link (which may also be referred to as an uplink) 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, a frequency band used on the forward link 118 may be different from that used on the reverse link 120, and a frequency band used on the forward link 124 may be different from that used on the reverse link 126.

For another example, in a time division duplex (TDD) system or a full duplex system, a frequency band used on the forward link 118 may be the same as that used on the reverse link 120, and a frequency band used on the forward link 124 may be the same as that used on the reverse link 126.

A coverage area of each antenna (or an antenna group including a plurality of antennas) and/or a transmission area that are/is designed for communication are/is referred to as a sector of the network device 102. For example, an antenna group may be designed to communicate with a terminal device in a sector, namely, a coverage area, of the network device 102. A network device can send signals to all terminal devices in a sector corresponding to the network device by using a single antenna or through multi-antenna transmit diversity. In a process in which the network device 102 communicates with the terminal devices 116 and 122 through the forward links 118 and 124 respectively, transmit antennas of the network device 102 can increase signal-tonoise ratios of the forward links 118 and 124 through beamforming. In addition, compared with a manner in which a network device sends, by using a single antenna or through multi-antenna transmit diversity, signals to all terminal devices served by the network device, when the network device 102 sends, through beamforming, signals to the terminal devices 116 and 122 randomly scattered in a related coverage area, a mobile device in a neighboring cell suffers from less interference.

Within a given time period, the network device 102, the terminal device 116, or the terminal device 122 may be a wireless transmission device and/or a wireless receiving device. When sending data, the wireless transmission device may encode the data for transmission. Specifically, the wireless transmission device may obtain (for example, by generating, by receiving from another communication device, or by storing in a memory) a specific number of data bits to be transmitted to the wireless receiving device through a channel. Such data bits may be included in a transport block (or a plurality of transport blocks), and the transport block may be segmented into a plurality of code blocks.

In addition, the system 100 may be a PLMN network, a device-to-device (D2D) network, a machine-to-machine (M2M) network, an IoT network, or another network. FIG. 1 is merely a simplified schematic diagram. The network may further include other network device that are not shown in FIG. 1.

The network device may be a network device in a current network, a network device in a future evolved PLMN network, or the like. This is not limited in the embodiments of this application.

The following describes in detail a to-be-transmitted object (that is, feedback information) in the embodiments of this application.

In the embodiments of this application, a feedback technology may be used for downlink data transmission. By way of example but not limitation, the feedback technology may include, for example, a hybrid automatic repeat request (HARQ) technology.

The HARQ technology is a technology formed by combining forward error correction (FEC) coding with an automatic repeat request (ARQ) technology.

For example, in the HARQ technology, after receiving data from a transmit end, a receive end may determine whether the data is correctly decoded. If the data is not correctly decoded, the receive end may feed back NACK information to the transmit end, so that the transmit end can determine, based on the NACK information, that the receive end has not correctly received the data, and thereby may perform retransmission. If the data is correctly decoded, the receive end may feed back ACK information to the transmit end, so that the transmit end can determine, based on the ACK information, that the receive end has correctly received the data, and thereby can determine that data transmission is completed.

In other words, in the embodiments of this application, the receive end may send the ACK information to the transmit end when decoding is successfully, and may send the NACK information to the transmit end when decoding is unsuccessful.

By way of example but not limitation, in the embodiments of this application, uplink control information may include ACK information or NACK information in the HARQ technology.

In an LTE system, a downlink slot and an uplink slot are respectively based on orthogonal frequency division multiple access (OFDMA) and single-carrier frequency division multiple access (SC-FDMA). A time-frequency resource is divided into OFDM or SC-FDMA symbols (referred to as time domain symbols below) in a time domain dimension and subcarriers in a frequency domain dimension. A smallest resource granularity is referred to as a resource element (RE), and represents a time-frequency grid point including a time domain symbol in time domain and a subcarrier in frequency domain.

Service transmission in the LTE system is based on scheduling by a base station. A basic time unit for scheduling is one subframe, and one subframe includes a plurality of time domain symbols. A specific scheduling procedure is that the base station sends a control channel, for example, a physical downlink control channel (PDCCH) or an enhanced physical downlink control channel (EPDCCH). The control channel may carry scheduling information of a physical downlink shared channel (PDSCH) or a physical uplink shared channel (PUSCH), and the scheduling information includes, for example, control information such as resource allocation information and a modulation and coding scheme (MCS). A terminal device detects a control channel in a subframe, and performs downlink data channel receiving or uplink data channel sending based on scheduling information carried on the detected control channel. In the embodiments of this application, a PDCCH is used as an example for describing a downlink control channel, a PDSCH is used as an example for describing a downlink data channel, a physical uplink control channel (PUCCH) is used as an example for describing an uplink control channel, an ACK/NACK is used as an example for describing feedback information, a carrier is used as an example for describing a frequency domain unit, a subframe is used as an example for describing a time unit in the LTE system, a slot is used as an example for describing a time unit in a 5G system, and a base station is used as an example for describing a network device. This application is not limited thereto.

The LTE system supports two duplex modes: FDD and TDD. In an FDD system, a downlink subframe and an uplink subframe are used for transmission on different carriers. In a TDD system, an uplink subframe and a downlink subframe are used for transmission at different times on one carrier. In a frame structure in TDD, a special subframe may be used as a downlink subframe. The special subframe can carry downlink data but cannot carry uplink data.

A HARQ mechanism is used for the LTE system, and downlink transmission is used as an example. After the terminal device receives the PDSCH, if the PDSCH is correctly received, the terminal device feeds back an ACK on the PUCCH. If the PDSCH is not correctly received, the terminal device feeds back an NACK on the PUCCH. In FDD, for example, after receiving the PDSCH in a subframe n−4, the terminal device feeds back an ACK/NACK in a subframe n. In TDD, for example, a timing relationship between PDSCH reception and corresponding ACK/NACK feedback is shown in Table 1. A numbered subframe is an uplink subframe n used for ACK/NACK feedback, and an identification number indicates that an ACK/NACK corresponding to a PDSCH in a downlink subframe set corresponding to n−k (k belongs to K) downlink subframes needs to be fed back in the uplink subframe n.

For example, as shown in Table 1 below, K={7, 6} corresponding to a subframe n=2 in an uplink/downlink configuration 1 indicates that the subframe n=2 is used to feed back ACKs/NACKs corresponding to PDSCHs in two downlink subframes corresponding to n−7 and n−6. Specifically, n−7 indicates a downlink subframe 5, and n−6 indicates a downlink subframe 6.

TABLE 1

| Uplink/Downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The LTE system also supports a carrier aggregation (CA) technology. To be specific, a base station configures a plurality of carriers for one terminal device, to increase a data rate of the terminal device. During CA, the plurality of carriers sent by the base station are synchronized in time. The terminal device can separately detect a PDCCH for scheduling each carrier and a corresponding PDSCH, where a specific detection procedure for each carrier is similar to the foregoing case of a single carrier.

The LTE system also supports FDD CA, TDD CA, and FDD+TDD CA. In a CA mode, there is one primary component carrier and at least one secondary component carrier. In a typical configuration, a PUCCH carrying an ACK/NACK is sent only on a primary component carrier of the terminal device. In a PUCCH sending mode in the CA mode, a PUCCH format 3 mode is usually used. In the PUCCH format 3 mode, a DFT-S-OFDM sending structure is used. The structure can support transmission of a maximum of 20 ACK/NACK bits and support TDD CA of five carriers.

A mainstream deployment, a TDD uplink/downlink configuration 2, in a current network is used as an example. An uplink subframe 2 corresponding to one carrier may support feedback of four ACK/NACK bits, and TDD CA of five carriers that corresponds to the TDD uplink/downlink configuration 2 corresponds to 20 ACK/NACK bits. The 20 bits form an ACK/NACK codebook, that is, a bitstream of original ACK/NACK bits before coding that are arranged in an order.

It should be understood that the foregoing listed content included in feedback information is merely used as an example for description, and this application is not limited thereto.

An uplink ACK/NACK codebook configuration in the LTE system includes a semi-persistent codebook configuration and a dynamic codebook configuration. In the dynamic codebook configuration, a codebook is determined based on the number of PDSCHs scheduled in real time.

In the semi-persistent codebook configuration, a codebook is determined based on the number of downlink subframes in a semi-persistent downlink subframe set.

For example, an ACK/NACK codebook includes feedback information corresponding to all downlink subframes in the semi-persistent downlink subframe set. The downlink subframes include a downlink subframe for an actually scheduled PDSCH or a downlink subframe for semi-persistent scheduling (SPS) release indication, and also include an unscheduled downlink subframe. An NACK is set in a position of in the codebook corresponding to an unscheduled downlink subframe or a downlink subframe whose scheduling signaling is not received by a terminal device.

Figure 2:
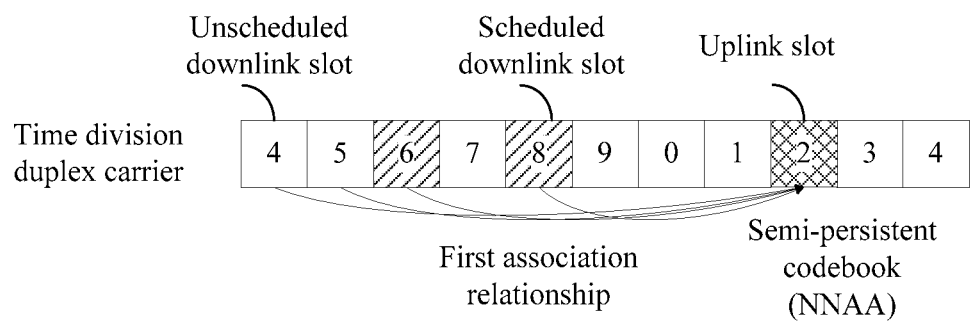
FIG. 2 is a schematic diagram of an association relationship in an LTE system based on a semi-persistent codebook (a single time division duplex (TDD) carrier is used as an example) according to an embodiment of this application.

FIG. 2 is a schematic diagram of an association relationship in an LTE system (a single TDD carrier is used as an example) according to an embodiment of this application. Specifically, FIG. 2 is a schematic diagram of a first association relationship based on a semi-persistent codebook configuration in the LTE system.

In the semi-persistent codebook configuration, a subframe in which a PUCCH carrying an ACK/NACK codebook exists corresponds to a semi-persistent downlink subframe set.

For example, when five TDD carriers are configured for a terminal device for carrier aggregation (other scenarios may be considered as a particular case of this scenario), a time set may include a plurality of subframes corresponding to these TDD carriers configured for the terminal device.

It is assumed that uplink/downlink subframe configurations of the TDD carriers are identical. For example, an uplink subframe 2, in which a PUCCH carrying an ACK/NACK codebook exists, corresponds to a downlink subframe set {4, 5, 6, 8} in each of these TDD carriers.

As shown in FIG. 2 (one carrier is used as an example herein), the ACK/NACK codebook includes feedback information corresponding to four downlink subframes in each of the 5 TDD carriers. In other words, a size of the codebook, that is, the number of bits of the ACK/NACK codebook, is 20. Herein, it is assumed that one downlink subframe corresponds to one ACK/NACK bit.

There is an association relationship between the uplink subframe 2 and the downlink subframes {4, 5, 6, 8} corresponding to each carrier. In the LTE system, the association relationship may be preconfigured according to a standard. That is, the association relationship does not need to be notified to the terminal device by using signaling.

In other words, after obtaining a TDD uplink/downlink configuration, the terminal device obtains an association relationship corresponding to the uplink/downlink configuration, thereby obtaining a timing relationship between a downlink subframe carrying a PDSCH and a corresponding uplink subframe for feeding back an ACK/NACK.

For example, the timing relationship may be the timing relationship between PDSCH reception and corresponding ACK/NACK feedback shown in Table 1.

As shown in FIG. 2, in the downlink subframes {4, 5, 6, 8}, the downlink subframes {6, 8} may be scheduled downlink subframes, and the downlink subframes {4, 5} may be unscheduled downlink subframes. The terminal device may determine whether data in the downlink subframes {6, 8} is correctly decoded, and send ACK/NACK information in the uplink subframe 2. Because the downlink subframes {4, 5} are unscheduled, for the downlink subframes, NACKs need to be sent in the uplink subframe 2.

Therefore, in the current LTE system, for feedback information in the semi-persistent codebook configuration, a codebook of the feedback information is determined based on the number of downlink subframes in the semi-persistent downlink subframe set.

The LTE system further supports a fallback mechanism in the semi-persistent codebook configuration.

For example, if a PUCCH format 3, format 4, or format 5 PUCCH sending mode (an ACK/NACK of more than two bits can be carried in each of PUCCHs of these formats) is configured for the terminal device:

in a codebook and resource fallback mode: if the terminal device receives only a primary PDCCH for scheduling a PDSCH on a primary component carrier, and a DAI field on the primary PDCCH is indicated as '1', the terminal device uses a PUCCH format 1a/1b to feed back 1-bit (for a single codebook) or 2-bit (for two codebooks) ACK/NACK information; or in a non-fallback mode: if the terminal device receives a primary PDCCH for scheduling a PDSCH on a primary component carrier, and a value indicated by a DAI field on the primary PDCCH is greater than '1', or the terminal device receives a secondary PDCCH for scheduling a PDSCH on a secondary component carrier, the terminal device uses a PUCCH format 3 to feed back an ACK/NACK. A channel resource of the PUCCH format 3 is explicitly indicated by a 2-bit field in the primary PDCCH, including the DAI value greater than 1, or a 2-bit field on the secondary PDCCH.

In this case, the ACK/NACK codebook includes feedback information corresponding to all downlink subframes in the semi-persistent downlink subframe set. The downlink subframes include a downlink subframe for an actually scheduled PDSCH or a downlink subframe for SPS release indication, and also include an unscheduled downlink subframe. A NACK is set in a position of the codebook corresponding to an unscheduled downlink subframe or a downlink subframe whose scheduling signaling is not received by the terminal device.

In a special fallback mode (an SPS PDSCH is considered): if the terminal device receives only a primary PDCCH for scheduling a PDSCH on a primary component carrier and an SPS PDSCH, and a DAI field on the primary PDCCH is indicated as '1', the SPS PDSCH is not dynamically scheduled through a PDCCH in most cases, and no field for indicating a PUCCH format 3 resource exists on the primary PDCCH.

Therefore, in this case, it is not possible to roll back to the PUCCH format 1a/1b, and the PUCCH format 3 resource cannot be used to carry a non-fallback codebook. A solution used in the LTE system is the special fallback mode. Specifically, channel selection is performed between a dynamic PUCCH format 1a/1b resource determined through the primary PDCCH and a semi-persistent PUCCH format 1a/1b resource corresponding to the SPS PDSCH.

A 5G system also supports the foregoing semi-persistent codebook configuration, the fallback codebook, and the fallback scheduling mechanism. However, different from the LTE system, there are a first association relationship and a second association relationship in the 5G system. The following describes the fallback codebook and the fallback scheduling mechanism in the 5G system based on the first association relationship and the second association relationship in the 5G system.

The first association relationship and the second association relationship in the 5G system are described first.

Figure 3:
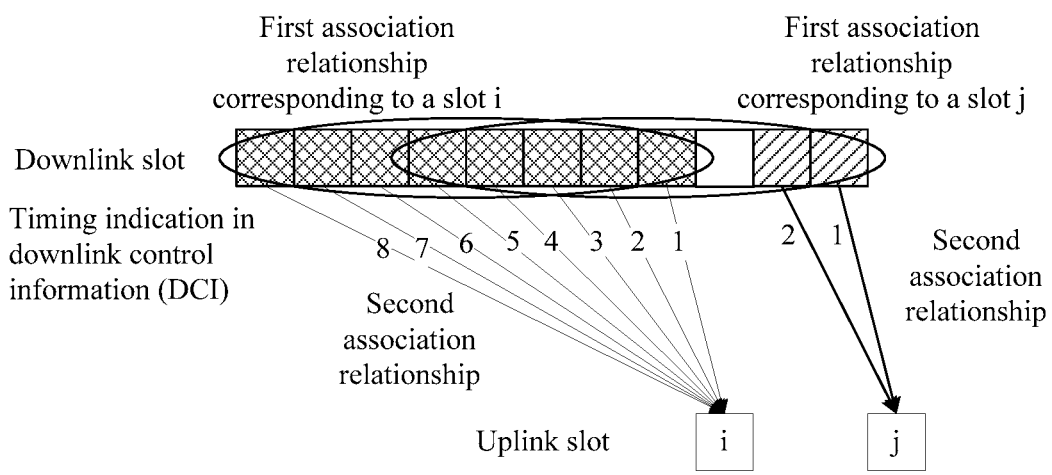
FIG. 3 is a schematic diagram of an association relationship in a 5G communication system (a single TDD carrier is used as an example) according to an embodiment of this application.

FIG. 3 is a schematic diagram of an association relationship in a 5G system according to an embodiment of this application. As shown in FIG. 3, there are two association relationships in a semi-persistent codebook configuration in the 5G system.

It should be understood that this embodiment of this application is mainly about the semi-persistent codebook configuration and the following descriptions are mainly based on the semi-persistent codebook configuration.

A first association relationship is similar to the foregoing association relationship in the LTE system, but supports a more flexible configuration.

For example, the first association relationship may be preconfigured or notified to a terminal device by using RRC dedicated signaling.

In other words, for fallback PDCCH scheduling, the first association relationship may be preconfigured. For non-fallback PDCCH scheduling, the first association relationship may be notified to the terminal device by using RRC dedicated signaling.

If the terminal device needs to detect the two types of PDCCHs, the first association relationship may be a union set of the preconfigured association relationship and the association relationship notified by using signaling.

For example, a semi-persistent codebook that needs to be fed back in an uplink slot n may correspond to downlink slots {n−1, n−2, n−3, n−4, n−5, n−6, n−7, n−8}, where n−1 to n−8 may be preconfigured, or notified to the terminal device by using RRC dedicated signaling.

In addition, the first association relationship may be related to a PDCCH detection slot.

For example, the first association relationship may be an intersection set between the union set of the preconfigured association relationship and the association relationship notified by using RRC signaling and the PDCCH detection slot.

For example, a cycle of the PDCCH detection slot is two slots, that is, a PDCCH needs to be detected in slots {n−1, n−3, n−5, n−7}. In this case, the first association relationship may be an intersection set between {n−1, n−2, n−3, n−4, n−5, n−6, n−7, n−8} and {n−1, n−3, n−5, n−7}, that is, {n−1, n−3, n−5, n−7}.

However, a configuration of the PDCCH detection slot may alternatively be preconfigured, or notified to the terminal device by using RRC dedicated signaling. Therefore, the first association relationship may be preconfigured, or notified to the terminal device by using RRC dedicated signaling.

A second association relationship is determined based on timing indication information on a PDCCH. In other words, the second association relationship is indicated to the terminal device by using the timing indication information on the PDCCH.

For example, the PDCCH includes 3-bit timing indication information, such as timing indication on downlink control information (DCI). The timing indication information is used to indicate a timing relationship between a slot in which a PDSCH scheduled through the PDCCH is located and a slot in which an ACK/NACK is located.

For example, when the first association relationship is {n−1, n−2, n−3, n−4, n−5, n−6, n−7, n−8}, timing indication information on a PDCCH may be one of the eight values in the first association relationship.

As shown in FIG. 3, for an uplink slot i, slot sets corresponding to the first association relationship and the second association relationship may be the same, that is, each of the slot set includes downlink slots 1 to 8. For an uplink slot j, a slot set corresponding to the first association relationship is still downlink slots 1 to 8, but a slot set corresponding to the second association relationship may include only downlink slots 1 and 2. In other words, the slot set corresponding to the second association relationship may be a subset of the slot set corresponding to the first association relationship.

In this embodiment of this application, different from the LTE system, there are the first association relationship and the second association relationship in the 5G system.

With reference to specific examples, the following describes in detail embodiments of a fallback codebook and a fallback scheduling mechanism based on the first association relationship and the second association relationship in the 5G system.

It should be noted that the description is merely intended to help understanding of the embodiments of this application, but are not intended to limit the scope of the embodiments of this application.

It should be understood that in the embodiments of this application, first downlink information, second downlink information, a first codebook, a second codebook, "first", "second", and the like are merely used to indicate different objects, and do not mean that any other limitations are imposed on the indicated objects.

Figure 4:
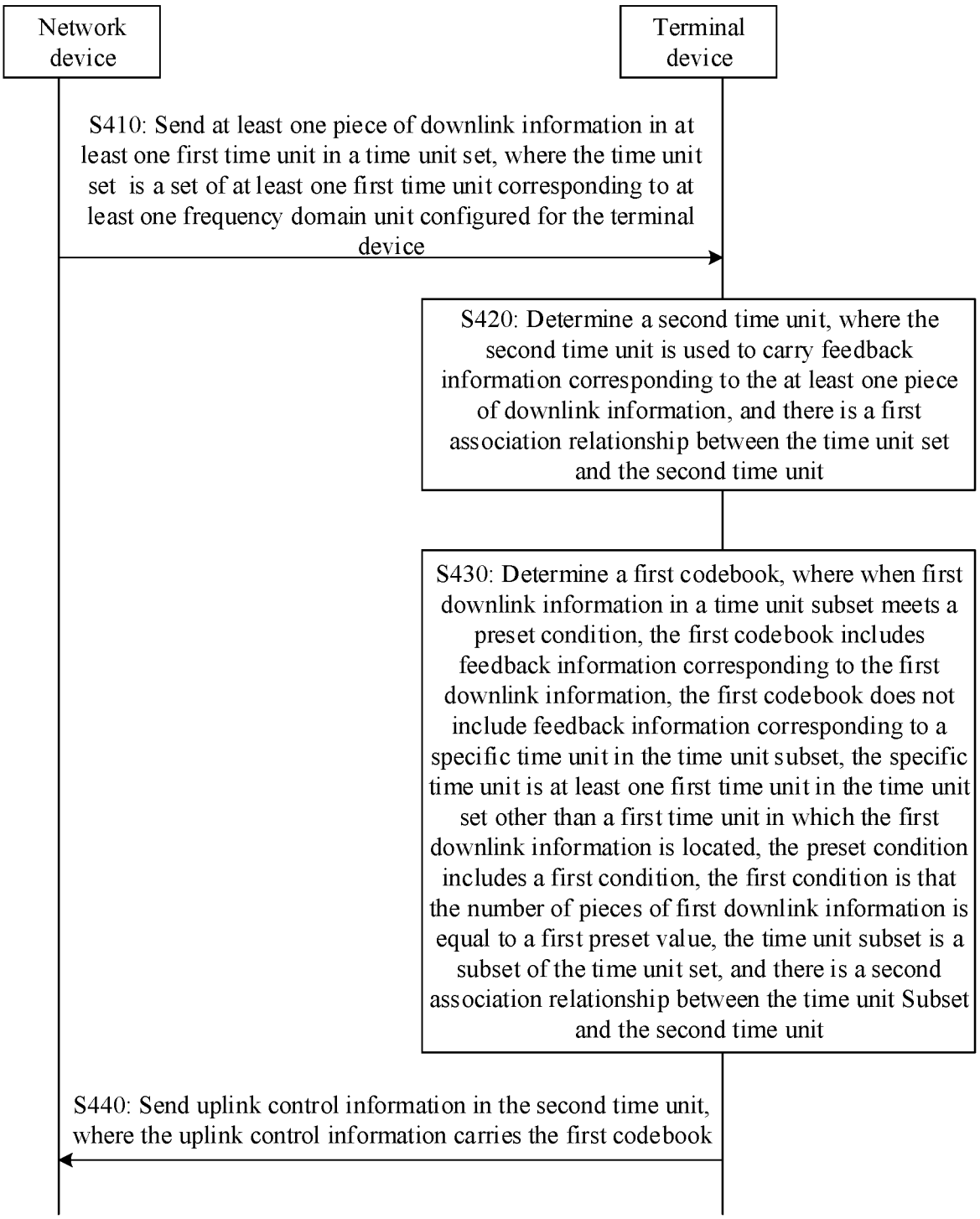
FIG. 4 is an interaction flowchart of sending feedback information by a terminal device according to an embodiment of this application.

FIG. 4 is an interaction flowchart of sending feedback information by a terminal device according to an embodiment of this application.

The terminal device in FIG. 4 may be any terminal device in FIG. 1, and a network device in FIG. 4 may be the network device in FIG. 1. This is not limited in this application.

It should be noted that in this embodiment of this application, downlink information may be a PDSCH. This is not limited in this application.

S410: The terminal device receives at least one piece of downlink information in at least one first time unit in a time unit set, where the time unit set is a set of at least one first time unit corresponding to at least one frequency domain unit configured for the terminal device.

In other words, the network device sends at least one piece of downlink information to the terminal device in at least one first time unit in a time unit set, where the time unit set is a set of at least one first time unit corresponding to at least one frequency domain unit configured for the terminal device.

It should be understood that the time unit set may be a set of at least one first time unit in different frequency domain units. The first time unit may be a downlink time unit or a flexible time unit, and is used for receiving downlink information. In the first time unit, one piece of downlink information or a plurality of pieces of downlink information may be received. This is not limited in this application.

Optionally, a time unit may be at least one of a slot, a mini-slot, and a subframe. For example, in this embodiment of this application, a slot may be used as an example for description.

Optionally, a frequency domain unit may be a carrier or a carrier BWP. For example, in this embodiment of this application, a carrier may be used as an example for description.

S420: The terminal device determines a second time unit, where the second time unit is used to carry feedback information corresponding to the at least one piece of downlink information, and there is a first association relationship between the time unit set and the second time unit.

Optionally, the second time unit may be an uplink time unit or a flexible time unit. For example, in this embodiment of this application, an uplink slot may be used as an example for description.

Optionally, the first association relationship may be preconfigured, or notified to the terminal device by using RRC dedicated signaling. Generally, for fallback PDCCH scheduling, the first association relationship may be preconfigured. For non-fallback PDCCH scheduling, the first association relationship may be notified to the terminal device by using RRC dedicated signaling.

S430: The terminal device determines a first codebook, where when first downlink information in a subset of the time unit set (referred to as time unit subset) meets a preset condition, the first codebook includes feedback information corresponding to the first downlink information, the first codebook does not include feedback information corresponding to a specific time unit in the time unit subset, the specific time unit is at least one first time unit in the time unit set other than a first time unit in which the first downlink information is located, the preset condition includes a first condition, the first condition is that the number of pieces of first downlink information is equal to a first preset value, the time unit subset is a subset of the time unit set, and there is a second association relationship between the time unit subset and the second time unit.

In other words, when the first downlink information in the time unit subset meets the condition that the number of pieces of the first downlink information is equal to the first preset value, the first codebook may include only the feedback information corresponding to the first downlink information.

Specifically, this solution may also be applied to the following case: A plurality of PDSCHs that do not overlap in time domain may be scheduled for one terminal device in one first time unit corresponding to one frequency domain unit. For example, one first time unit includes 14 time domain symbols. It is preconfigured that a time domain location in the first time unit includes the Pt to the 7th time domain symbols and the 8th to the $14^{th}$ time domain symbols. These two groups of time domain locations do not overlap in time domain, and in a normal non-fallback semi-persistent codebook, the first time unit corresponds to feedback of a 2-bit ACK/NACK.

The pre-configuration is performed by using RRC signaling. Specifically, a time domain location to be actually scheduled is indicated by a time domain resource assignment indicator field on the PDCCH. For example, one bit on the PDCCH may be used to specifically indicate one of the foregoing two groups of time domain locations.

In this scenario, the first codebook includes the feedback information corresponding to the first downlink information. The first codebook does not include the feedback information corresponding to the specific time unit in the time unit subset, and the first codebook does not include feedback information corresponding to a time domain location, in the first time unit in which the PDSCH is located, other than a time domain location in which the PDSCH is located. In other words, in this case, the first codebook includes only the first downlink information, that is, feedback information corresponding to the PDSCH.

Alternatively, in the foregoing scenario, the different time domain locations may be considered as different first time units. For example, the $1^{st}$ to the $7^{th}$ time domain symbols and the $8^{th}$ to the $14^{th}$ time domain symbols are respectively considered as two first time units. In this case, the first codebook includes the feedback information corresponding to the first downlink information, and the first codebook does not include the feedback information corresponding to the specific time unit in the time unit subset.

When the number of pieces of the first downlink information in the time unit subset does not meet the first condition, the first codebook includes feedback information corresponding to all the first time units in the time unit set.

For example, the first preset value may be 1, and a downlink slot set includes a downlink slot 1 to a downlink slot 8, that is, the time unit set includes the downlink slots 1 to 8. A downlink slot subset corresponding to an uplink slot includes the downlink slot 1 and the downlink slot 2, that is, the time unit subset includes the downlink slot 1 and the downlink slot 2.

When the number of PDSCHs received in the downlink slot 1 and the downlink slot 2 is 1, the first condition included in the preset condition is met. For example, only a PDSCH in the downlink slot 1 is received. In this case, an ACK/NACK codebook may include only an ACK/NACK corresponding to the PDSCH in the downlink slot 1, and does not include an ACK/NACK corresponding to another downlink slot in the downlink slot set, that is, the downlink slots 1 to 8.

When the number of PDSCHs received in the downlink slot 1 and the downlink slot 2 is not 1, the first condition included in the preset condition is not met. For example, a PDSCH in the downlink slot 1 and a PDSCH in the downlink slot 2 are received. In this case, an ACK/NACK codebook includes ACK/NACKs corresponding to PDSCHs in the downlink slot set, that is, the downlink slots 1 to 8. In other words, no codebook fallback is performed, and a normal semi-persistent codebook is used instead. This is not limited in this application.

For another example, the first preset value may be 2. In this case, it is assumed that two dynamically scheduled PDSCHs may be received in one downlink slot corresponding to one carrier. For example, a plurality of transmission points or base stations each send one dynamically scheduled PDSCH to the terminal device in one downlink slot corresponding to one carrier. The first condition is that when the number of PDSCHs received in one of the downlink slot 1 and the downlink slot 2 is 2, the first condition included in the preset condition is not met. For example, only two PDSCHs in the downlink slot 1 are received. In this case, an ACK/NACK codebook may include only ACKs/NACKs corresponding to the two PDSCHs in the downlink slot 1, and does not include an ACK/NACK corresponding to another downlink slot in the downlink slot set, that is, the downlink slots 1 to 8. When the number of PDSCHs received in the downlink slot 1 and the downlink slot 2 does not meet the first condition included in the preset condition, for example, PDSCHs in the downlink slot 1 and PDSCHs in the downlink slot 2 are received, the ACK/NACK codebook includes ACK/NACKs corresponding to PDSCHs in the downlink slot set, that is, the downlink slots 1 to 8. In other words, no codebook fallback is performed, and a normal semi-persistent codebook is used instead. It should be understood that this is not limited in this application.

Figure 5:
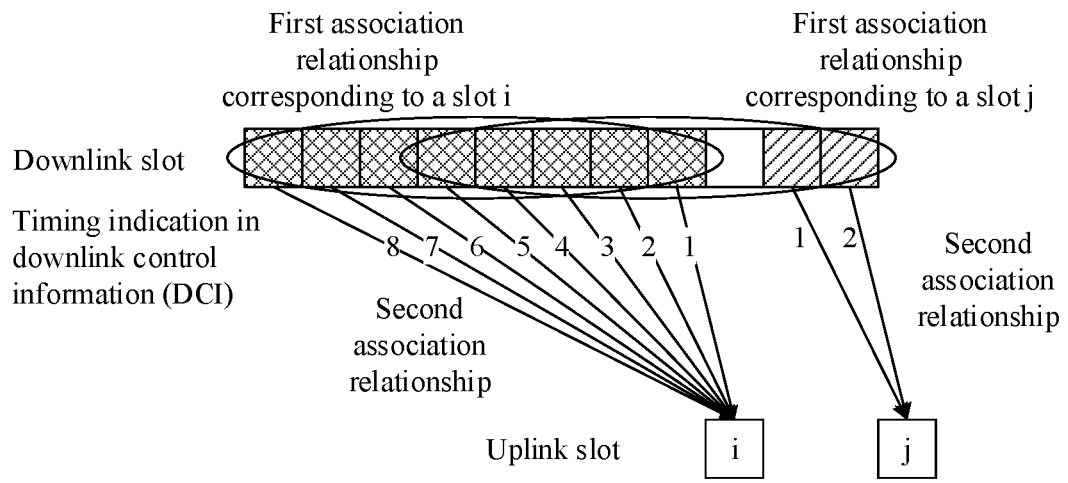
FIG. 5 is a schematic diagram of scheduling a plurality of PDSCHs by using one piece of downlink control information (DCI) according to an embodiment of this application.

Optionally, the technical solution in this embodiment of this application is applicable to a scenario in which one piece of DCI is used for scheduling a plurality of PDSCHs. As shown in FIG. 5, for an uplink slot i, slot sets corresponding to a first association relationship and a second association relationship may be the same, that is, each of the slot sets includes downlink slots 1 to 8. For an uplink slot j, a slot set corresponding to the first association relationship is still downlink slots 1 to 8, but a slot set corresponding to the second association relationship may include only downlink slots 1 and 2, that is, a time unit subset includes the downlink slot 1 and the downlink slot 2. In addition, a PDSCH in the downlink slot 1 and a PDSCH in the downlink slot 2 are scheduled by using one piece of DCI. In other words, this is the scenario in which one piece of DCI is used for scheduling a plurality of PDSCHs.

The first preset value is X, where X may be a positive integer greater than or equal to 1. For example, X=1, 2, 3, 4, 5, 6, 7, 8. The first time unit may be a time unit corresponding to a symbol in which the last piece of first downlink information in a plurality of pieces of first downlink information is located, or may be a time unit corresponding to a symbol in which the first piece of first downlink information in the plurality of pieces of first downlink information is located. For example, four PDSCHs are in a downlink slot 1 to a downlink slot 4. A first time unit corresponding to the four PDSCHs may be the downlink slot 4, or may be the downlink slot 1.

For example, in this embodiment of this application, the first preset value may be 4. It is assumed that four PDSCHs may be received in at least one downlink slot corresponding to one carrier, and the four PDSCHs are used to carry same transport block information. The four PDSCHs are scheduled by using one piece of DCI when the time unit subset meets the first condition included in the preset condition, that is, when the number of pieces of the first downlink information in the time unit subset is equal to the first preset value, the terminal device performs codebook fallback.

For example, the downlink slot set includes the downlink slot 1 to the downlink slot 8, and the downlink slot subset corresponding to the uplink slot includes the downlink slot 1 and the downlink slot 2, that is, the time unit subset includes the downlink slot 1 and the downlink slot 2. If the number of PDSCHs received only in the downlink slot 2 is 4, the ACK/NACK codebook may include only an ACK/NACK corresponding to the four PDSCHs in the downlink slot 2, and does not include an ACK/NACK corresponding to another downlink slot in slots 1 to 8 in the downlink slot set. If the number of PDSCHs received in the downlink slot 1 is 4, and the number of PDSCHs received in the downlink slot 2 is 4, the ACK/NACK codebook includes ACKs/NACKs corresponding to PDSCHs in the downlink slot 1 to 8 in the downlink slot set. In other words, no codebook fallback is performed, and a normal semi-persistent codebook is used instead.

It should be noted that in this embodiment of this application, the time unit subset meets the first condition included in the preset condition. That is, the number of pieces of the first downlink information in the time unit subset is equal to the first preset value. The number of pieces of first downlink information in only one time unit in the time unit subset may be equal to the first preset value, or the number of pieces of first downlink information in only one time unit in the time unit subset may be less than the first preset value.

For example, in this embodiment of this application, the first preset value may be 4. It is assumed that four PDSCHs may be received in at least one downlink slot corresponding to one carrier, and the four PDSCHs are used to carry same transport block information. The four PDSCHs are scheduled by using one piece of DCI. In this case, when the first condition is that the number of PDSCHs received in at least one downlink slot in the time unit subset is less than or equal to 4, the first condition included in the preset condition is met.

For example, only four PDSCHs in the downlink slot 1 are received. In this case, the ACK/NACK codebook may include only ACKs/NACKs corresponding to the four PDSCHs in the downlink slot 1, and does not include an ACK/NACK corresponding to another downlink slot in the downlink slots 1 to 8 in the downlink slot set.

In this embodiment of this application, the number of pieces of the first downlink information in the time unit subset may be less than the first preset value. For example, only three PDSCHs in the downlink slot 1 to the downlink slot 3 are received, and the three PDSCHs are scheduled by using one piece of DCI. In this case, the ACK/NACK codebook may include only ACKs/NACKs corresponding to the three PDSCHs in the downlink slot 1 to the downlink slot 3, and does not include an ACK/NACK corresponding to another downlink slot in the downlink slots 1 to 8 in the downlink slot set.

When the number of PDSCHs received in the time unit subset does not meet the first condition included in the preset condition, the ACK/NACK codebook includes ACKs/NACKs corresponding to PDSCHs in the downlink slots 1 to 8 in the downlink slot set. In other words, no codebook fallback is performed, and a normal semi-persistent codebook is used instead.

For example, when five PDSCHs are received in at least one slot in the time unit subset, the ACK/NACK codebook includes ACKs/NACKs corresponding to PDSCHs in the downlink slots 1 to 8 in the downlink slot set. In other words, no codebook fallback is performed, and a normal semi-persistent codebook is used instead.

It should be understood that when a plurality of PDSCHs are received in at least one slot in the time unit subset, if the plurality of PDSCHs are not scheduled by using a same piece of DCI, no codebook fallback is performed, and a normal semi-persistent codebook is used instead.

For example, when the first preset value may be 4, four PDSCHs are received in at least one slot in the time unit subset, and the four PDSCHs are scheduled by using two pieces of DCI. In this case, the ACK/NACK codebook includes an ACK/NACK corresponding to a PDSCH in the downlink slots 1 to 8 in the downlink slot set. In other words, no codebook fallback is performed, and a normal semi-persistent codebook is used instead. It should be understood that in this embodiment of this application, 4 is merely an example for description, and does not constitute a limitation on this embodiment of this application.

It should be noted that in this embodiment of this application, the first preset value needs to be less than or equal to a third preset value, where the third preset value is determined based on a downlink aggregation parameter configured by using higher layer signaling from a base station, and the downlink aggregation parameter is the number of retransmissions of information in the first downlink information. The downlink aggregation parameter may be the number of retransmissions of information in the first downlink information in one slot, or the downlink aggregation parameter may be the number of retransmissions of information in the first downlink information in a plurality of slots. This is not limited in this application.

Optionally, the downlink aggregation parameter may be the number of retransmissions of information in the first downlink information in one slot. In this case, the first condition may be applied to one or more downlink slots in the downlink slot set.

For example, the first preset value may be 2. It is assumed that two PDSCHs may be received only in one downlink slot corresponding to one carrier in the time unit subset (the downlink slot 1 and the downlink slot 2), and the two PDSCHs are used to carry same transport block information. The two PDSCHs are scheduled by using one piece of DCI. In this case, when the first condition may be that the number of PDSCHs received in one downlink slot in the time unit subset is less than or equal to 2, the first condition included in the preset condition is met. For example, only two PDSCHs in the downlink slot 1 are received. In this case, the ACK/NACK may include only ACKs/NACKs corresponding to the two PDSCHs in the downlink slot 1, and does not include an ACK/NACK corresponding to another downlink slot in slots 1 to 8 in the downlink slot set.

When the number of PDSCHs received in the time unit subset does not meet the first condition included in the preset condition, for example, when three PDSCHs are received in a slot in the time unit subset, for example, when three PDSCHs are received in the downlink slot 2, the number of PDSCHs, that is, 3, is greater than the first preset value. Therefore, the condition is not met. In this case, the ACK/NACK codebook includes ACKs/NACKs corresponding to PDSCHs in the downlink slots 1 to 8 in the downlink slot set. In other words, no codebook fallback is performed, and a normal semi-persistent codebook is used instead.

A correspondence between the number of PDSCHs received in the time unit subset and the downlink aggregation parameter does not meet the first condition included in the preset condition. For example, one PDSCH is received in the downlink slot 1 and one PDSCH is received in the downlink slot 2. In this case, the ACK/NACK codebook includes ACKs/NACKs corresponding to PDSCHs in the downlink slots 1 to 8 in the downlink slot set. In other words, no codebook fallback is performed, and a normal semi-persistent codebook is used instead. It should be understood that in this case, the two PDSCHs do not belong to one downlink slot. Therefore, it may be considered that a condition that the downlink aggregation parameter is the number of retransmissions of information in the first downlink information in one slot is not met. It should be understood that in this embodiment of this application, 2 is merely an example for description, and does not constitute a limitation on this embodiment of this application.

Optionally, the downlink aggregation parameter may be the number of retransmissions of information in the first downlink information in a plurality of slots. In this case, the first condition is applied to a plurality of downlink slots in the downlink slot set.

For example, the first preset value may be 2. It is assumed that two PDSCHs may be received in two downlink slots corresponding to one carrier in the time unit subset (the downlink slot 1 and the downlink slot 2), and the two PDSCHs are used to carry same transport block information. The two PDSCHs are scheduled by using one piece of DCI. In this case, when the first condition is that the number of PDSCHs received in a plurality of downlink slots in the downlink slot set in the time unit subset is less than or equal to 2, the first condition included in the preset condition is met.

For example, one PDSCH is received in each of the downlink slot 1 and the downlink slot 2. In this case, the ACK/NACK codebook may include only ACKs/NACKs corresponding to the two PDSCHs in the downlink slot 1 and the downlink slot 2, and does not include an ACK/NACK corresponding to another downlink slot in the downlink slots 1 to 8 in the downlink slot set.

When the number of PDSCHs received in the time unit subset does not meet the first condition included in the preset condition, for example, when two PDSCHs are received in the downlink slot 1 and one PDSCH is received in the downlink slot 2, the ACK/NACK codebook includes ACKs/

NACKs corresponding to PDSCHs in the downlink slots 1 to 8 in the downlink slot set. In other words, no codebook fallback is performed, and a normal semi-persistent codebook is used instead. It should be understood that in this case, the number of PDSCHs, that is, 3, is greater than the first preset value. Therefore, it may be considered that the condition is not met.

A correspondence between the number of received PDSCHs and the downlink aggregation parameter does not meet the first condition included in the preset condition. For example, only two PDSCHs are received in the downlink slot 1. In this case, the ACK/NACK codebook includes ACKs/NACKs corresponding to PDSCHs in the downlink slots 1 to 8 in the downlink slot set. In other words, no codebook fallback is performed, and a normal semi-persistent codebook is used instead. It should be noted that in this case, the two PDSCHs belong to one downlink slot. Therefore, it may be considered that a condition that the downlink aggregation parameter is the number of retransmissions of information in the first downlink information in a plurality of slots is not met. It should be understood that in this application, 2 is merely an example, and does not constitute a limitation.

It should be understood that when the first preset value is 8, eight PDSCHs are used to carry same transport block information. One bit may be used to indicate whether the terminal device correctly decodes data after a receive end receives the transport block information carried on the eight PDSCHs. Alternatively, eight bits may be used to indicate whether the terminal device correctly decodes data after the receive end receives transport block information carried on each of the eight PDSCHs. This is not limited in this embodiment of this application.

It should be noted that the first preset value is less than or equal to a third preset value, and the third preset value is determined based on a downlink aggregation parameter configured by using higher layer signaling. It may be understood that the downlink aggregation parameter may be the number of retransmissions of information in the first downlink information. When the third preset value is Y, X is less than or equal to Y. Y may be a positive integer greater than or equal to 1. This is not limited in this application.

Optionally, in this case, the first condition includes that the number of pieces of the first downlink information is less than or equal to the first preset value and not greater than the third preset value, the time unit subset is a subset of the time unit set, and there is a second association relationship between the time unit subset and the second time unit. Optionally, the first condition further includes that the downlink aggregation parameter is greater than 1. Optionally, the first preset value is greater than 1.

Optionally, in this case, the first condition includes that the number of pieces of the first downlink information is less than or equal to the first preset value, the time unit subset is a subset of the time unit set, and there is a second association relationship between the time unit subset and the second time unit. Optionally, the first condition further includes that the downlink aggregation parameter is greater than 1. Optionally, the first preset value is greater than 1.

Optionally, the first preset value is the number of bits of feedback information corresponding to a first time unit corresponding to a frequency domain unit in the semi-persistent codebook configuration. In addition, if the number of dynamically scheduled PDSCHs received in the time unit subset is less than the first preset value, and all these PDSCHs are located in the first time unit in the frequency domain unit, an NACK is set in a bit in the first codebook other than an ACK/NACK bit corresponding to the PDSCH. This solution is mainly applied to a case in which a plurality of PDSCHs that do not overlap in time domain may be scheduled for one terminal device in one first time unit corresponding to one frequency domain unit. For example, one first time unit includes 14 time domain symbols. It is preconfigured that a time domain location in the first time unit includes the $1^{st}$ to the $7^{th}$ time domain symbols and the $8^{th}$ to the $14^{th}$ time domain symbols. These two groups of time domain locations do not overlap in time domain, and in a normal non-fallback semi-persistent codebook, the first time unit corresponds to feedback of a 2-bit ACK/NACK. In this case, the first preset value is 2. The pre-configuration is performed by using RRC signaling. Specifically, a time domain location to be actually scheduled is indicated by a time domain resource assignment indicator field on the PDCCH. For example, one bit on the PDCCH may be used to specifically indicate one of the foregoing two groups of time domain locations.

In the foregoing optional solution, there may be the following two cases.

Case 1: When the number of dynamically scheduled PDSCHs received in the time unit subset is 1, a size of the first codebook is equal to the first preset value, that is, the number of bits of feedback information corresponding to a first time unit corresponding to a frequency domain unit in the semi-persistent codebook configuration. An NACK is set in a bit in the first codebook other than an ACK/NACK bit corresponding to the PDSCH in the first codebook. For example, in the foregoing example, the first preset value is 2, the size of the first codebook is two bits, and an NACK is set in an ACK/NACK location corresponding to a time domain location in which no PDSCH is received.

Case 2: When the number of dynamically scheduled PDSCHs received in the time unit subset is 1, and all these PDSCHs are located in the first time unit in the frequency domain unit, a size of the first codebook is equal to the first preset value, that is, the number of bits of feedback information corresponding to a first time unit corresponding to a frequency domain unit in the semi-persistent codebook configuration. For example, in the foregoing example, the first preset value is 2. If the number of dynamically scheduled PDSCHs received in the time unit subset is 2, the size of the first codebook is two bits respectively corresponding to ACK/NACK feedback for PDSCHs in the foregoing two groups of time domain locations.

Optionally, in this embodiment of this application, the second association relationship is an association relationship determined through the downlink control channel for dynamic scheduling.

For example, the second association relationship may be determined based on timing indication information on a PDCCH. In other words, the second association relationship is indicated to the terminal device by using the timing indication information on the PDCCH. The PDCCH includes 3-bit timing indication information, and the timing indication information is used to indicate a timing relationship between a slot in which a PDSCH scheduled through the PDCCH is located and a slot in which an ACK/NACK is located. For example, when the first association relationship is {n–1, n–2, n–3, n–4, n–5, n–6, n–7, n–8}, timing indication information on a PDCCH is one of the eight values in the first association relationship.

Optionally, in this embodiment of this application, the preset condition may further include a second condition, the second condition is that a value of indication information on a downlink control channel for dynamically scheduling the first downlink information is a second preset value, and the downlink control channel is a control channel for fallback scheduling.

In this embodiment of this application, for example, the second preset value may be a preset DAI value.

For example, the time unit subset includes a downlink slot 10 and a downlink slot 11. The first preset value, that is, the number of pieces of the first downlink information, in the first condition may be 1.

It is assumed that the second preset value is 1. A value of a DAI included on a PDCCH for scheduling a PDSCH in the downlink slot 10 is 1, and a value of a DAI included on a PDCCH for scheduling a PDSCH in the downlink slot 11 is 2. If the terminal device misses detection of the PDCCH in the downlink slot 11, the terminal device detects only one scheduled PDSCH, and the first condition is met, that is, the number of pieces of downlink control information is 1 (for example, when the first preset value is 1). The second preset value included in the downlink slot 10 also meets the second condition and is 1. In this case, the terminal device sends an ACK/NACK corresponding to the PDSCH in the downlink slot 10 to a base station. In this case, the base station and the terminal device have a consistent understanding of a fallback codebook. To be specific, both the base station and the terminal device consider that a 1-bit ACK/NACK in the fallback codebook corresponds to a PDSCH (for example, the PDSCH in the downlink slot 10) with a DAI being 1. This is not limited in this application.

Optionally, in this embodiment of this application, the downlink control channel may be a control channel for fallback scheduling.

In this embodiment of this application, for example, a downlink control channel for fallback scheduling may have at least one of the following characteristics. For example, the downlink control channel for fallback scheduling may be used for data scheduling performed before RRC establishment; and none of values of all fields on the downlink control channel for fallback scheduling may be configured by using RRC dedicated signaling.

In this embodiment of this application, for example, the terminal device may be configured to detect a downlink control channel for non-fallback scheduling. The control channel for non-fallback scheduling may have at least one of the following characteristics, for example, the downlink control channel is used for data scheduling performed after RRC establishment; and a value of at least one field in the control channel may be configured by using RRC dedicated signaling.

For example, a time domain resource allocation field, a DAI field, a BWP indication field, and the like may be configured on the downlink control channel for non-fallback scheduling by using RRC dedicated signaling.

Optionally, indication information included on the downlink control channel for dynamically scheduling the first downlink information may be a DAI field, and the preset value is preferably DAI=1 or a value indicated by a state '00' of the DAI field.

Optionally, in this embodiment of this application, the preset condition may further include a third condition, and the third condition is that the first time unit in which the first downlink information is located is a first time unit in a specific time domain location in the time unit set.

Optionally, there may be one or more specific time domain locations.

In the following scenario: for a terminal device, there may be a plurality of candidate time domain locations in one slot corresponding to one carrier, the plurality of candidate time domain locations are preconfigured by using RRC signaling or predefined according to a standard. The plurality of candidate time domain locations may overlap with each other in time domain, but do not overlap in time domain in actual scheduling.

For example, one slot includes 14 time domain symbols. A plurality of preconfigured candidate time domain locations in one slot include a first, second, third, and fourth candidate time domain locations. It is assumed that the candidate time domain locations are the $1^{st}$ to the $4^{th}$ time domain symbols, the $3^{rd}$ to the $6^{th}$ time domain symbols, the $7^{th}$ to the time domain symbols, and the $9^{th}$ to the $14^{th}$ time domain symbols, respectively. A maximum number of candidate time domain locations that do not overlap in time domain and that are included in the four groups of time domain symbols is 2. Therefore, in a normal non-fallback semi-persistent codebook, two ACK/NACK bits are fed back in one slot corresponding to one carrier. The four groups of time domain locations that are preconfigured are configured by using RRC signaling. Specifically, a time domain location to be actually scheduled is indicated by a time domain resource assignment indicator field on the PDCCH. For example, two bits on the PDCCH may be used to specifically indicate one of the foregoing four groups of time domain locations.

Assuming that the first preset value is 1, codebook fallback is performed only when one only PDSCH received by the terminal device in the time unit subset is determined, or in other words, codebook fallback is performed only when it is determined that a PDSCH in the first time unit is a PDSCH scheduled in a specific time domain location in the time unit set.

Therefore, optionally, if each candidate time domain location is considered as the first time unit, the specific time domain location may be a specific first time unit in a plurality of first time units with a maximum number that are included in one slot and that do not overlap in time domain, or a first time unit overlapping with the specific first time unit in time domain in the slot.

Specifically, the plurality of first time units with a maximum number that are in the slot and that do not overlap in time domain are a first and a third candidate time domain locations, and a specific first time unit is determined according to a preset rule. For example, the specific first time unit is a first time unit with an earliest start time domain symbol or a latest start time domain symbol in the plurality of first time units. For example, the specific first time unit is determined as the first candidate time domain location, and a time domain location overlapping with the first candidate time domain location in time domain further includes the third candidate time domain location. When there are a plurality of candidate time domain locations overlapping in time domain, only one candidate time domain location may be scheduled during actual scheduling. Therefore, the first time units corresponding to the first and the third candidate time domain locations may be used as the specific time domain location.

In this embodiment of this application, it is assumed that the first preset value in the first condition included in the preset condition is 1, and the third condition is that the first time unit in the specific time domain location is an earliest downlink slot.

For example, if the number of dynamically scheduled PDSCHs received by the terminal device in a downlink slot subset corresponding to the uplink slot i is equal to the first preset value 1, and a downlink slot in which the dynamically scheduled PDSCH is located is a preset time domain location in the downlink slot set, that is, an earliest downlink slot in the downlink slot set, an ACK/NACK codebook may include only an ACK/NACK corresponding to the PDSCH in the downlink slot 1, and does not include an ACK/NACK corresponding to another downlink slot in the downlink slot set corresponding to the uplink slot i.

Optionally, in this embodiment of this application, the preset condition may further include a fourth condition, and the fourth condition is that the first downlink information is carried in a primary frequency domain unit or a first secondary frequency domain unit in the at least one frequency domain unit.

For example, a plurality of carriers may be configured for the terminal device, and codebook fallback may be based on whether a PDSCH is scheduled. In this case, a predetermined carrier may be selected for the PDSCH. For example, the predetermined carrier may be a primary carrier, a primary bandwidth part, a primary secondary carrier, or a primary secondary bandwidth part.

A carrier is used as an example. The primary secondary carrier may be a primary carrier in a secondary carrier group in a dual connection mode, or the primary secondary carrier may be a secondary carrier carrying a PUCCH.

It should be understood that in this embodiment of this application, the preset condition may further include any one or more of the second condition, the third condition, and the fourth condition in addition to the first condition. For example, the preset condition further includes the second condition and the third condition in addition to the first condition. Alternatively, the preset condition further includes the second condition and the fourth condition in addition to the first condition. This is not limited in this application.

Optionally, the value of the indication information is set according to a predefined rule related to the time unit subset.

In other words, the value of the indication information included on the downlink control channel corresponding to the first downlink information included in the time unit subset is set according to the predefined rule, and the preset rule is not related to a value of indication information included on a downlink control channel corresponding to downlink information in a time unit in the time unit set other than the time unit subset.

For example, a downlink slot set includes a downlink slot 1 to a downlink slot 8, that is, the time unit set includes the downlink slots 1 to 8. A downlink slot subset corresponding to an uplink slot includes the downlink slot 1 and the downlink slot 2, that is, the time unit subset includes the downlink slot 1 and the downlink slot 2. A value of the indication information is related to a value of indication information included on a downlink control channel for scheduling a PDSCH in the downlink slot 1 and the downlink slot 2, and is not related to a value of indication information included on a downlink control channel for scheduling a PDSCH in the downlink slot 3 to the downlink slot 8.

It should be understood that in this embodiment of this application, a value of indication information may be a value of a DAI.

Optionally, in this embodiment of this application, for at least one first time unit that corresponds to each of the at least one frequency domain unit and that is in the first time unit subset, the predefined rule is performing cumulative counting in a sequential order of time units.

For example, the preset rule may be that a value of indication information of at least one time unit in a time unit subset corresponding to a first frequency domain unit may be counted as {1,2,3,4, 1,2,3,4, . . . }, and a value of indication information of at least one time unit in a time unit subset corresponding to a second frequency domain unit may be counted as {1,2,3,4, 1,2,3,4, . . . }. This is not limited in this application. It should be noted that the number of bits in a DAI field is usually 2. Therefore, there are only four states: '00', '01', '10', and '11', and corresponding values may be 1, 2, 3, and 4, respectively, or 0, 1, 2, and 3, respectively. That the values are 1, 2, 3, and 4 is used as an example. If a value exceeds 4, cyclic counting may be performed. For example, the foregoing counts {1,2,3,4, 1,2,3,4, . . . } are actual counts {1,2,3,4, 5,6,7,8, . . . }.

Optionally, in this embodiment of this application, for at least one first time unit that corresponds to the at least one frequency domain unit and that is in the first time unit subset, the predefined rule is performing cumulative counting first in a frequency-domain order and then in a time-domain order.

For example, the preset rule may be that a time unit 1 corresponding to a frequency domain unit 1 is identified as 1, a time unit 1 corresponding to a frequency domain unit 2 is identified as 2, a time unit 1 corresponding to a frequency domain unit 3 is identified as 3, and so on. Then, a time unit 2 corresponding to the frequency domain unit 1 is identified as 4, a time unit 2 corresponding to the frequency domain unit 2 is identified as 5, a time unit 2 corresponding to the frequency domain unit 3 is identified as 6, and so on. In other words, the preset rule is performing cumulative counting first in a frequency-domain order and then in a time-domain order.

In this embodiment of this application, a problem of inconsistent understanding between a terminal device and a base station that may be caused due to codebook fallback is resolved through independent DAI cumulative counting in a slot subset.

Optionally, in this embodiment of this application, the first association relationship is predefined according to a standard and/or configured for the terminal device by the network device by using RRC signaling.

S440: The terminal device sends uplink control information in the second time unit, where the uplink control information carries the first codebook.

In other words, the terminal device sends the first codebook in the second time unit, and the second time unit may be an uplink time unit.

Optionally, the second time unit may be an uplink time unit or a flexible time unit. In this embodiment of this application, an uplink slot is used as an example for description.

It should be noted that the terminal device may send, in the second time unit, a signal obtained through decoding/modulation by using the first codebook.

Optionally, in this embodiment of this application, the at least one piece of downlink information may further include second downlink information, where a downlink control channel for scheduling the second downlink information is a downlink control channel for semi-persistent scheduling, and the first codebook further includes feedback information corresponding to the second downlink information.

Optionally, in this embodiment of this application, before the terminal device determines the first codebook, the terminal device determines a semi-persistent codebook mode from a plurality of candidate codebook modes, where the plurality of candidate codebook modes include a semi-persistent codebook mode and a dynamic codebook mode.

Optionally, in this embodiment of this application, before the terminal device sends the feedback information in the second time unit based on the first codebook, the terminal device determines a target resource set of an uplink control channel, and determines a target resource of the uplink control channel from the target resource set. The terminal device sends the uplink control information on the target resource in the second time unit, where the uplink control information carries the first codebook.

For example, when the number of pieces of the first downlink information in the at least one piece of downlink information is equal to the first preset value (for example, the first preset value is 1) or when the foregoing other conditions are met, that is, the first codebook in this case is a fallback codebook, the target resource set is a first resource set, and a codebook size of the first codebook corresponding to the first resource set is less than or equal to 2.

In other words, when the number of pieces of the first downlink information, which may be the number of PDSCHs, meets the first condition included in the preset condition, for example, when the first preset value is 1, that is, the terminal device detects a PDCCH for one scheduled PDSCH, the terminal device may perform codebook fallback. In this case, the terminal device sends the first codebook of the feedback information on a first target resource in the first resource set.

Optionally, in this embodiment of this application, when the number of pieces of the first downlink information in the at least one piece of downlink information is not the first preset value, the target resource set is a second resource set, and a codebook size of the first codebook corresponding to the second resource set is greater than 2. In this case, the first codebook is a non-fallback codebook or a normal semi-persistent codebook. In this case, the terminal device sends the first codebook of the feedback information on a second target resource in the second resource set.

It should be understood that in this embodiment of this application, the first downlink information may alternatively be dynamically scheduled downlink information.

For example, the first downlink information may include downlink SPS release indication or a dynamically scheduled downlink data channel, where a dynamically scheduled downlink data channel may be dynamically scheduled through a downlink control channel.

It should be noted that dynamic scheduling means that each transmission of a downlink data channel needs to be scheduled through a corresponding downlink control channel.

A dynamically scheduled downlink data channel corresponds to a semi-persistently scheduled downlink data channel that is scheduled through a semi-persistent downlink control channel. To be specific, after a semi-persistent downlink control channel is sent once, a corresponding semi-persistent downlink data channel may be always sent according to a preconfigured sending cycle, with no need to send the semi-persistent downlink control channel each time.

Semi-persistent downlink scheduling may be released through a specific downlink control channel. A downlink control channel used to implement release indication of the semi-persistent downlink scheduling is usually not used to schedule a downlink data channel. However, the terminal device also feeds back ACK/NACK feedback information for the downlink control channel.

It should be understood that in this embodiment of this application, a dynamically scheduled downlink data channel may alternatively be used as an example for describing downlink information. This is not limited in this application.

Optionally, in this embodiment of this application, in the dynamic codebook mode, the terminal device may determine a second codebook of feedback information, where the second codebook includes feedback information corresponding to an actually scheduled first time unit in the time unit set.

In this embodiment of this application, in the semi-persistent codebook mode, for a slot in which feedback information is sent, when a plurality of pieces of downlink data are scheduled in a plurality of time units in a time unit set corresponding to the first association relationship, codebook fallback may be performed when the number of pieces of downlink data corresponding to the second association relationship sent in the slot is equal to the first preset value (for example, the first preset value is 1). When other several conditions in the preset condition are met, performance of feedback information demodulation is improved.

Figure 6:
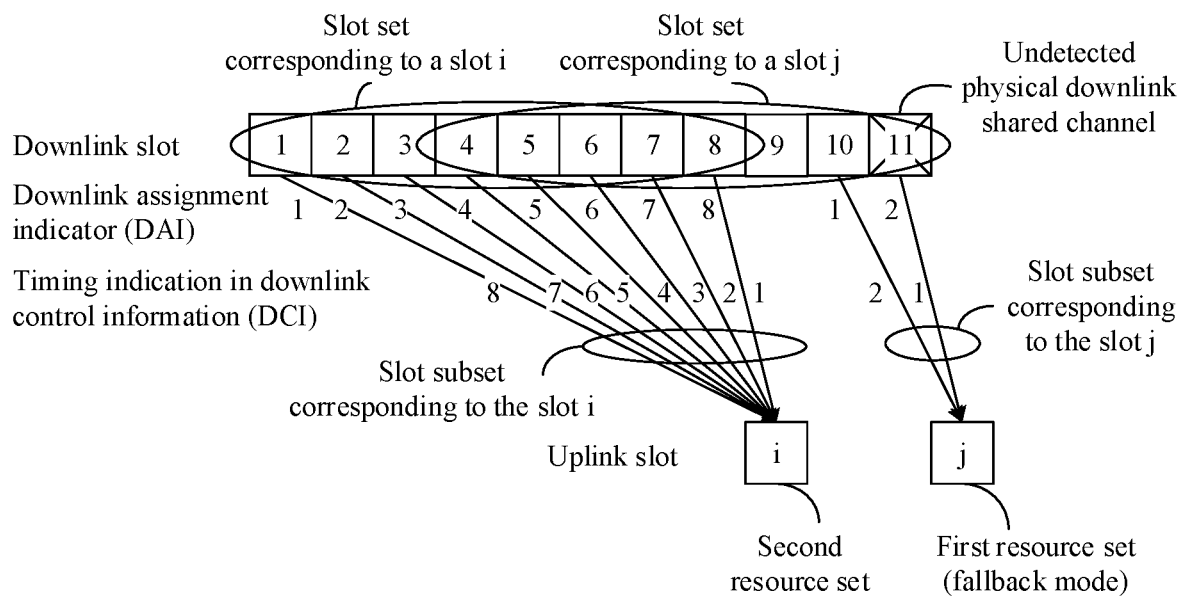
FIG. 6 is a schematic diagram of a feedback information fallback mode according to an embodiment of this application.

FIG. 6 is a schematic diagram of a feedback information fallback mode according to an embodiment of this application.

It should be understood that in FIG. 6, a single carrier is used as an example for describing this embodiment. This embodiment of this application may be extended to a case of a plurality of carriers.

In FIG. 6, a downlink slot set (for example, a first time unit set) corresponding to an uplink slot i includes downlink slots 1 to 8. A base station actually schedules a PDSCH for a terminal device in each downlink slot. A downlink slot set corresponding to an uplink slot j includes slots 4 to 11. The base station actually schedules PDSCHs for the terminal device in the downlink slots 4 to 8 and the downlink slots 10 and 11, but does not schedule the downlink slot 9 for the terminal device.

The terminal device may feed back ACK/NACK information to the base station in both the uplink slots i and j. There is a first association relationship between the uplink slot i and the downlink slots 1 to 8, and there is a first association relationship between the uplink slot j and the downlink slots 4 to 11. The first association relationship is specifically a timing relationship between a candidate slot for scheduling a PDSCH and a slot for an ACK/NACK. Specifically, the first association relationship may be predefined according to a standard or notified by the base station to the terminal device by using RRC dedicated signaling.

A downlink slot subset corresponding to the uplink slot i includes the downlink slots 1 to 8, and a downlink slot subset corresponding to the uplink slot j includes the downlink slots 10 and 11. It can be learned that the downlink slot subset corresponding to the uplink slot i is a subset of the downlink slot set corresponding to the uplink slot i, and the downlink slot subset corresponding to the uplink slot j is a subset of the downlink slot set corresponding to the uplink slot j.

For example, there is a second association relationship between the uplink slot i and the downlink slots 1 to 8, and there is a second association relationship between the uplink slot j and the downlink slots 10 and 11. The second association relationship is a timing relationship between a slot in which an actually scheduled PDSCH is located and the slot for the ACK/NACK. The timing relationship is determined by using timing indication information on a PDCCH for actually scheduling the PDSCH. In other words, the second association relationship is determined by using the timing indication information on the PDCCH for dynamically scheduling the PDSCH.

In this embodiment of this application, for example, an example in which an ACK/NACK is fed back in the uplink slot j is used to describe a feedback information fallback mode.

It is assumed that a first preset value is 1. If the number of dynamically scheduled PDSCHs received by the terminal device in the downlink slot subset corresponding to the uplink slot j is 1 (even if the terminal device receives a plurality of dynamically scheduled PDSCHs in the slot 4 to the slot 11 included in the downlink slot set), a first condition included in a preset condition is met. This is not limited in this application.

For example, when a dynamically scheduled PDSCH in the downlink slot 10 is received, but a PDCCH for dynamically scheduling a PDSCH in the downlink slot 11 is undetected, an ACK/NACK codebook (that is, a first codebook) may include only an ACK/NACK corresponding to the PDSCH in the downlink slot 10, and does not include an ACK/NACK corresponding to another downlink slot in the slot 4 to the slot 11 in the downlink slot set corresponding to the uplink slot j. This is not limited in this application.

For example, when PDCCHs for dynamically scheduling PDSCHs in the downlink slot 10 and the downlink slot 11 is received, the number of pieces of downlink information is 2. In this case, the first condition included in the preset condition is not met, that is, the first preset value is not 1. In this case, the ACK/NACK codebook includes ACKs/NACKs in the downlink slots 4 to 11 in the downlink slot set. In other words, no codebook fallback is performed, and a normal semi-persistent codebook is used instead. This is not limited in this application.

To support codebook fallback, a value of the DAI field may be counted according to a preset rule, to avoid a possible error during codebook fallback.

For example, it is assumed that both DAIS on PDCCHs corresponding to the downlink slots 10 and 11 are set to be a preset value 1. If the terminal device misses detection of the PDCCH corresponding to the downlink slot 10, the terminal device sends, by using a fallback codebook, a 1-bit ACK/NACK corresponding to the downlink slot 11. Alternatively, if the terminal device misses detection of the PDCCH corresponding to the downlink slot 11, the terminal device sends, by using a fallback codebook, a 1-bit ACK/NACK corresponding to the downlink slot 10. However, a base station does not know which PDCCH is undetected by the terminal device. Therefore, the base station has a fuzzy understanding of a downlink slot corresponding to the fallback codebook.

A value of a DAI included on a PDCCH corresponding to a dynamically scheduled PDSCH in the downlink slot subset may be set according to a preset rule.

In addition, codebook fallback only occurs in a slot subset corresponding to the timing indication information or the second association relationship. Therefore, the preset rule is not related to a value of a DAI included on a PDCCH corresponding to a PDSCH in a slot in a slot set other than a slot subset.

For example, for a value of a DAI in the downlink slot subset corresponding to the uplink slot j, a rule is performing cumulative counting from the preset value in a time order. To be specific, the downlink slot 10 corresponds to DAI=1, and the downlink slot 11 is corresponding DAI=2.

Optionally, for at least one downlink slot corresponding to each of at least one carrier in a downlink slot subset (for example, a time unit subset), the preset rule may be performing cumulative counting in a sequential order of downlink slots; or for at least one downlink slot corresponding to the at least one carrier in the downlink slot subset, the preset rule may be performing cumulative counting first in a frequency-domain order and then in a time-domain order.

For example, the preset rule may be that a value of indication information of at least one time unit corresponding to a time unit subset in a first frequency domain unit may be counted as {1,2,3,4, 1,2,3,4, . . . }, and a value of indication information of at least one time unit in a time unit subset corresponding to a second frequency domain unit may be counted as {1,2,3,4, 1,2,3,4, . . . }. This is not limited in this application. It should be noted that the number of bits in a DAI field is usually 2. Therefore, there are only four states: '00', '01', '10', and '11', and corresponding values may be 1, 2, 3, and 4, respectively, or 0, 1, 2, and 3, respectively. That the values are 1, 2, 3, and 4 is used as an example. If a value exceeds 4, cyclic counting may be performed. For example, the foregoing counts {1,2,3,4, 1,2,3,4, . . . } are actual counts {1,2,3,4, 5,6,7,8, . . . }.

For another example, the preset rule may be that a time unit 1 corresponding to a frequency domain unit 1 is identified as 1, a time unit 1 corresponding to a frequency domain unit 2 is identified as 2, a time unit 1 corresponding to a frequency domain unit 3 is identified as 3, and so on. Then, a time unit 2 corresponding to the frequency domain unit 1 is identified as 4, a time unit 2 corresponding to the frequency domain unit 2 is identified as 5, a time unit 2 corresponding to the frequency domain unit 3 is identified as 6, and so on. In other words, the preset rule is performing cumulative counting first in a frequency-domain order and then in a time-domain order.

There may be a second association relationship between the time unit subset and a second time unit. Not all slots in which actually scheduled PDSCHs are located in the downlink slot set correspond to the uplink slot j based on the timing indication information.

For example, the actually scheduled downlink slots 4 to 8 in the set correspond to the uplink slot i based on the timing indication information, but only the downlink slots 10 and 11 in the set correspond to the uplink slot j based on the timing indication information. Therefore, the terminal device may determine, based on only whether the number of dynamically scheduled PDSCHs in the subset is equal to the first preset value, whether to perform codebook fallback.

Optionally, the preset condition meeting the codebook fallback may further include the following conditions.

Optionally, the preset condition further includes a second condition, and the second condition is that a value of indication information on a downlink control channel for dynamically scheduling the first downlink information is a second preset value.

For example, a value of a DAI included on a received PDCCH for dynamically scheduling only one PDSCH in a slot subset is a second preset value.

For example, the second preset value is 1. A value of a DAI included on a PDCCH for scheduling a PDSCH in the downlink slot 10 is 1, and a value of a DAI included on a PDCCH for scheduling a PDSCH in the downlink slot 11 is 2. If the terminal device misses detection of the PDCCH in the downlink slot 11, the terminal device detects only one scheduled PDSCH, and the first condition is met, that is, the number of pieces of downlink control information is 1 (for example, when the first preset value is 1). The second preset value included in the PDCCH for scheduling the PDSCH in the downlink slot 10 also meets the second condition and is 1. In this case, the terminal device sends an ACK/NACK corresponding to the PDSCH in the downlink slot 10 to a base station. In this case, the base station can learn, based on DAI values in different downlink slots, that the sent feedback information corresponds to the PDSCH in the downlink slot 10. This is not limited in this application.

It should be understood that a PDCCH for scheduling a PDSCH includes a DAI value. Therefore, both the terminal device and the base station can determine a DAI value corresponding to any downlink slot.

If the second condition is not used, the base station cannot determine whether the terminal device misses detection of a PDCCH corresponding to the downlink slot 10 or the downlink slot 11. Therefore, a problem of inconsistent understanding between the base station and the terminal device with respect to a downlink slot corresponding to a fallback codebook is caused.

That the second preset value may be 1 is also based on a case in which bits in a DAI are limited. For example, specific states of a 2-bit DAI may be {00,01,10,11}.

In this case, four values that are different from each other, for example, {1,2,3,4}, may be identified. Considering that a probability that four consecutive PDCCHs are not detected is very low, a DAI cycle may be used to represent more values. For example, {00,01,10,11, 00,01,10,11, . . . } is used to represent values {1,2,3,4, 1,2,3,4, . . . }.

It should be understood that in this embodiment of this application, a correspondence between another state and a value is not limited. For example, the values may be identified as {0,1,2,3, 0,1,2,3, . . . }, that is, the values may be identified starting from 0.

It should be noted that, using FIG. 6 as an example, it is assumed that downlink slots {1, 2, 3, 4, 5, 6, 7, 8} may be represented as {1,2,3,4, 1,2,3,4} by using a DAI cycle.

If the base station dynamically schedules five downlink slots: {1,2,3,4,5}, the downlink slots {1,2,3,4} are not detected by the terminal device, only a PDCCH corresponding to a dynamically scheduled PDSCH in the downlink slot 5 is detected. In this case, the first preset value is 1. If the second preset value is 1, a DAI value of the dynamically scheduled PDSCH in the downlink slot 5 is also equal to the second preset value. In this case, the PDSCH in the downlink slot 5 meets conditions corresponding to both the first preset value and the second preset value, and a terminal device sends feedback information of the dynamically scheduled PDSCH in the downlink slot 5 to the base station.

In this case, the base station cannot learn a downlink slot undetected by the terminal device. Therefore, after the base station receives feedback information, the base station cannot determine whether the feedback information is feedback information of a dynamically scheduled PDSCH in the downlink slot 2 or the downlink slot 6. In this case, there may be a problem of inconsistent understanding between the base station and the terminal device with respect to a downlink slot corresponding to a fallback codebook. However, in this embodiment of this embodiment, a probability that four consecutive PDCCHs are not detected is very low. Therefore, there is no problem of inconsistent understanding between the base station and the terminal device with respect to a downlink slot corresponding to a fallback codebook.

Optionally, the preset condition further includes a fourth condition, and the fourth condition is that the first downlink information is carried in a primary frequency domain unit or a first secondary frequency domain unit in the at least one frequency domain unit.

In this embodiment of this embodiment, a plurality of carriers may be configured for the terminal device, and codebook fallback may be determined based on whether a PDSCH is scheduled. In this case, a predetermined carrier may be selected for the PDSCH.

For example, the predetermined carrier may be a primary carrier, a primary bandwidth part, a primary secondary carrier, or a primary secondary bandwidth part.

A carrier is used as an example. The primary secondary carrier may be a primary carrier in a secondary carrier group in a dual connection mode, or the primary secondary carrier may be a secondary carrier carrying a PUCCH.

Optionally, the fallback codebook is applicable to a case in which an SPS PDSCH exists.

For example, if only one dynamically scheduled PDSCH and one SPS PDSCH may be received in the downlink slot subset, the terminal device can still perform ACK/NACK feedback by using the fallback codebook. The fallback codebook may include only one ACK/NACK bit corresponding to one dynamically scheduled PDSCH and one ACK/NACK bit corresponding to one SPS PDSCH.

In an LTE system, if one dynamically scheduled PDSCH and one SPS PDSCH are received, only a special feedback mode of channel selection can be used. In a 5G system, however, a fallback codebook may be used in this case.

There may be ACK/NACK resource indication information, for example, a preconfigured DAI, on a PDCCH for dynamically scheduling a PDSCH. ACKs/NACKs respectively corresponding to the dynamically scheduled PDSCH and the SPS PDSCH may be carried on an indicated PUCCH resource.

Figure 7:
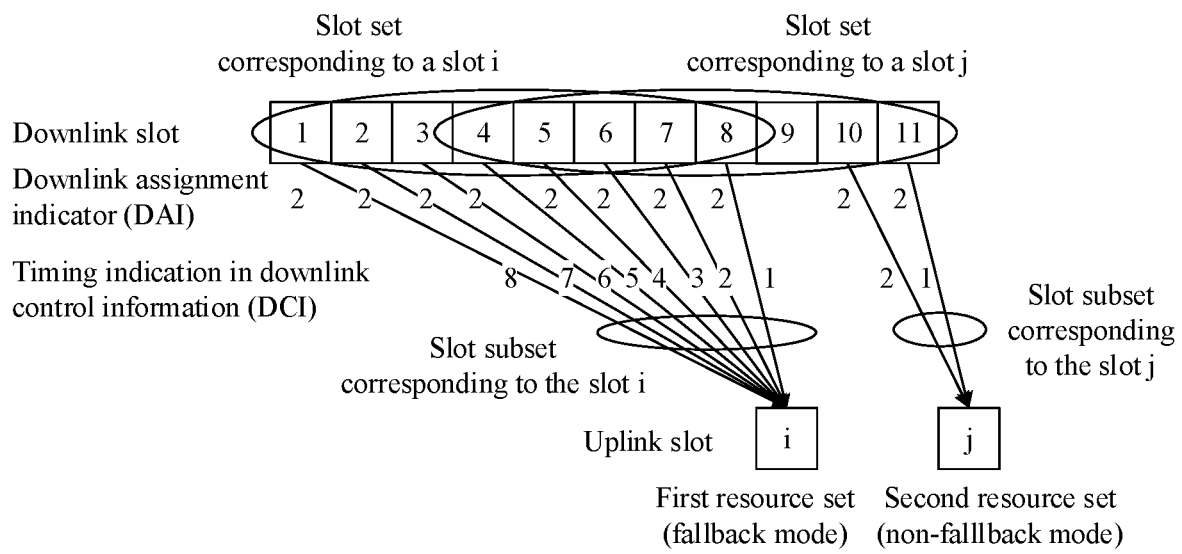
FIG. 7 is a schematic diagram of a feedback information fallback mode according to an embodiment of this application.

FIG. 7 is a schematic diagram of a feedback information fallback mode according to an embodiment of this application.

It should be understood that in FIG. 7, a single carrier is used as an example for describing this embodiment. This embodiment of this application may be extended to a case of a plurality of carriers.

In this embodiment of this application, for example, a downlink slot set corresponding to an uplink slot i includes downlink slots 1 to 8, and a base station actually schedules a PDSCH for a terminal device only in the downlink slot 1; and a downlink slot set corresponding to an uplink slot j includes downlink slots 4 to 11, and the base station actually schedules a PDSCH for the terminal device only in the downlink slot 10.

The terminal device feeds back ACK/NACK information to the base station in both the uplink slot i and the uplink slot j. There is a first association relationship between the uplink slot i and the downlink slots 1 to 8, and there is a first association relationship between the uplink slot j and the downlink slots 4 to 11. Specifically, the first association relationship may be shown in FIG. 3. This is not limited in this application.

As described in FIG. 7, a downlink slot subset corresponding to the uplink slot i includes the downlink slots 1 to 8, and a downlink slot subset corresponding to the uplink slot j includes the downlink slots 10 and 11.

It can be learned that the downlink slot subset corresponding to the uplink slot i is a subset of the downlink slot set corresponding to the uplink slot i, and the downlink slot subset corresponding to the uplink slot j is a subset of the downlink slot set corresponding to the uplink slot j.

Specifically, there is a second association relationship between the uplink slot i and the downlink slots 1 to 8. Specifically, the second association relationship may be shown in FIG. 3. This is not limited in this application.

Optionally, in this embodiment of this application, a preset condition further includes a third condition, and the third condition is that a first time unit in which the first downlink information is located is a first time unit in a specific time domain location in the time unit set.

Based on the third condition, no limitation needs to be imposed on a downlink control channel in a manner the same as that in the embodiment shown in FIG. 6, because dependence on a DAI value may not be required.

In other words, a downlink control channel for dynamically scheduling the first downlink information may be a downlink control channel for fallback scheduling, or a downlink control channel for non-fallback scheduling.

For the first time unit in the specific time domain location, it may be understood that once the time unit set is determined, the specific time domain location is an absolute time domain location in the time unit set.

For example, the first time unit may be preset to be an earliest time unit or a latest time unit in the time unit set. This is not limited in this application.

For example, an ACK/NACK fed back in the uplink slot i is used as an example for description.

Assuming that a first preset value in a first condition included in the preset condition is 1, codebook fallback is performed when the number of pieces of first downlink information is 1.

If the number of dynamically scheduled PDSCHs received by the terminal device in the downlink slot subset corresponding to the uplink slot i is a first preset value, for example, the first preset value is 1, and a downlink slot 1 in which the dynamically scheduled PDSCH is located is a preset time domain location in the downlink slot set (for example, the third condition is that the first time unit in the specific time domain location is an earliest downlink slot), an ACK/NACK codebook may include only an ACK/NACK corresponding to the PDSCH in the downlink slot 1, and does not include an ACK/NACK corresponding to another downlink slot in the downlink slot set corresponding to the uplink slot i.

If the number of dynamically scheduled PDSCHs received by the terminal device in the downlink slot subset corresponding to the slot i is a first preset value, for example, the first preset value is 1, and a downlink slot 1 in which the dynamically scheduled PDSCH is located is not a preset time domain location in the downlink slot set, that is, the third condition included in the preset condition is not met, an ACK/NACK codebook includes ACKs/NACKs corresponding to all PDSCHs in the downlink slot 1 to the downlink slot 8.

For example, an ACK/NACK fed back in the uplink slot j is used as an example for description.

Assuming that the first preset value in the first condition included in the preset condition is 1, codebook fallback is performed when the number of pieces of the first downlink information is 1.

If the number of dynamically scheduled PDSCHs received by the terminal device in the downlink slot set corresponding to the uplink slot j is a first preset value, for example, a dynamically scheduled PDSCH in the downlink slot 10 is received, but the downlink slot 10 in which the dynamically scheduled PDSCH is located is not a preset time domain location in the downlink slot set (for example, the third condition is that the first time unit in the specific time domain location is the earliest downlink slot 4), an ACK/NACK codebook is a normal semi-persistent codebook, that is, the ACK/NACK codebook needs to include ACKs/NACKs corresponding to all the downlink slots 4 to 11 in the downlink slot set.

Optionally, the preset condition further includes a fourth condition, and the fourth condition is that the first downlink information is carried in a primary frequency domain unit or a first secondary frequency domain unit in the at least one frequency domain unit.

In this embodiment of this embodiment, a plurality of carriers may be configured for the terminal device, and codebook fallback may be determined based on whether a PDSCH is scheduled. In this case, a predetermined carrier may be selected for the PDSCH.

For example, the predetermined carrier may be a primary carrier, a primary bandwidth part, a primary secondary carrier, or a primary secondary bandwidth part.

A carrier is used as an example. The primary secondary carrier may be a primary carrier in a secondary carrier group in a dual connection mode, or the primary secondary carrier may be a secondary carrier carrying a PUCCH.

Optionally, in this embodiment of this application, the preset condition may alternatively include both the second condition and the third condition. In other words, the value of the indication information on the downlink control channel for dynamically scheduling the first downlink information is the second preset value, and the first time unit in which the first downlink information is located is the first time unit in the specific time domain location in the time unit set. In this case, based on the second preset value and the first time unit in the specific time domain location, consistency of downlink slot understanding between the terminal device and a base station during codebook fallback is improved.

For example, it is assumed that the first preset value in the first condition included in the preset condition is 1, the second condition is that the second preset value is 1, and the third condition is that the first time unit in the specific time domain location is an earliest downlink slot (for example, the downlink slot 4).

An ACK/NACK fed back in the uplink slot j is used as an example for description.

If the terminal device receives a dynamically scheduled PDSCH in the downlink slot 10 in the downlink slot subset corresponding to the slot j, and misses detection of PDCCH corresponding to a dynamically scheduled PDSCH in the downlink slot 11, a DAI value on the PDCCH in the downlink slot 10 is 1, and a DAI value on the PDCCH in the downlink slot 11 is 2. The terminal cannot receive the PDCCH with the DAI value being 2 in the downlink slot 11 because the terminal device misses detection of the PDCCH in the downlink slot 11. In this case, the scheduled PDSCH in the downlink slot 10 meets the first condition and the second condition, but does not meet the third condition that the first time unit in the time domain location is an earliest downlink slot. Therefore, an ACK/NACK codebook is a normal semi-persistent codebook, that is, the ACK/NACK codebook needs to include ACKs/NACKs corresponding to all the downlink slots 4 to 11 in the downlink slot set.

Optionally, the fallback codebook is applicable to a case in which an SPS PDSCH exists.

For example, if only one dynamically scheduled PDSCH and one SPS PDSCH may be received in the downlink slot subset, the terminal device can still perform ACK/NACK feedback by using the fallback codebook. The fallback codebook may include only one ACK/NACK bit corresponding to one dynamically scheduled PDSCH and one ACK/NACK bit corresponding to one SPS PDSCH.

In an LTE system, if one dynamically scheduled PDSCH and one SPS PDSCH are received, only a special feedback mode of channel selection can be used. In a 5G system, however, a fallback codebook may be used in this case.

There may be ACK/NACK resource indication information, for example, a preconfigured DAI, on a PDCCH for dynamically scheduling a PDSCH. ACKs/NACKs respectively corresponding to the dynamically scheduled PDSCH and the SPS PDSCH may be carried on an indicated PUCCH resource.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the feedback information transmission method according to the embodiments of this application. In this application, based on the semi-persistent codebook mode, when the terminal device schedules a plurality of pieces of downlink information in at least one time unit for sending feedback information, specifically, in a plurality of time units in the time unit set corresponding to the first association relationship, when the number of pieces of downlink information corresponding to the second association relationship meets the first condition, codebook fallback can be performed, thereby improving efficiency of utilizing, by a system, a resource of an uplink control channel that carries feedback information. It should be understood that the terminal device and the network device in the embodiments of this application may perform the methods in the foregoing embodiments of this application. Therefore, for specific working processes of the following products, reference may be made to corresponding processes in the foregoing method embodiments.

Figure 8:
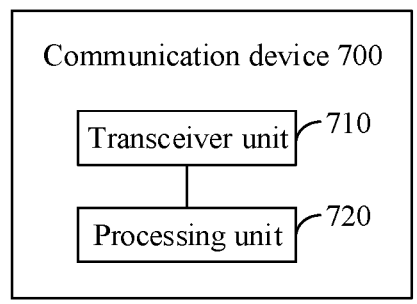
FIG. 8 is a schematic diagram of a communication device according to an embodiment of this application.

FIG. 8 is a schematic structural diagram of a communication device 700 according to an embodiment of this application. The communication device 700 may be a terminal device applied to the system shown in FIG. 1. As shown in FIG. 8, the communication device 700 includes a transceiver unit 710 and a processing unit 720.

The transceiver unit 710 and the processing unit 720 communicate with each other through an internal connection channel, to transfer a control signal and/or a data signal. In a possible design, the transceiver unit 710 and the processing unit 720 may be implemented by using a chip, to implement corresponding functions of a terminal device in this embodiment of this application.

In this embodiment of this application, the transceiver unit 710 is configured to:
receive at least one piece of downlink information in at least one first time unit in a time unit set, where the time unit set is a set of at least one first time unit corresponding to at least one frequency domain unit configured for the terminal device.

The processing unit 720 is configured to:
determine a second time unit, where the second time unit is used to carry feedback information corresponding to the at least one piece of downlink information, and there is a first association relationship between the time unit set and the second time unit; and determine a first codebook, where when first downlink information in a time unit subset meets a preset condition, the first codebook includes feedback information corresponding to the first downlink information, the first codebook does not include feedback information corresponding to a specific time unit in the time unit subset, the specific time unit is at least one first time unit in the time unit set other than a first time unit in which the first downlink information is located, the preset condition includes a first condition, the first condition is that the number of pieces of first downlink information is equal to a first preset value, the time unit subset is a subset of the time unit set, and there is a second association relationship between the time unit subset and the second time unit.

The transceiver unit 710 is configured to:
send uplink control information in the second time unit, where the uplink control information carries the first codebook.

Optionally, the processing unit 720 is further configured to:
determine a semi-persistent codebook mode from a plurality of candidate codebook modes, where the plurality of candidate codebook modes include a semi-persistent codebook mode and a dynamic codebook mode.

Optionally, the preset condition further includes a second condition, and the second condition is that a value of indication information on a downlink control channel for dynamically scheduling the first downlink information is a second preset value.

Optionally, the preset condition further includes a third condition, and the third condition is that the first time unit in which the first downlink information is located is a first time unit in a specific time domain location in the time unit set.

Optionally, the preset condition further includes a fourth condition, and the fourth condition is that the first downlink information is carried in a primary frequency domain unit or a first secondary frequency domain unit in the at least one frequency domain unit.

Optionally, in this embodiment of this application, the preset condition may alternatively include both the second condition and the third condition. In other words, the value of the indication information on the downlink control channel for dynamically scheduling the first downlink information is the second preset value, and the first time unit in which the first downlink information is located is the first time unit in the specific time domain location in the time unit set. In this case, based on the second preset value and the first time unit in the specific time domain location, consistency of downlink slot understanding between the terminal device and a base station during codebook fallback is improved.

It should be understood that in this embodiment of this application, the preset condition may further include any one or more of the second condition, the third condition, and the fourth condition in addition to the first condition. For example, the preset condition further includes the second condition and the third condition in addition to the first condition; or the preset condition further includes the second condition and the fourth condition in addition to the first condition. This is not limited in this application.

Optionally, when the number of pieces of the first downlink information in the time unit subset does not meet the first condition, the first codebook includes feedback information corresponding to all first time units in the time unit set.

Optionally, the value of the indication information is set according to a predefined rule related to the time unit subset.

Optionally, for at least one first time unit that corresponds to each of the at least one frequency domain unit and that is in the first time unit subset, the predefined rule is performing cumulative counting in a sequential order of time units; or for at least one first time unit that corresponds to the at least one frequency domain unit and that is in the first time unit subset, the predefined rule is performing cumulative counting first in a frequency-domain order and then in a time-domain order.

For example, the preset rule may be that a value of indication information of at least one time unit in a time unit subset corresponding to a first frequency domain unit may be counted as {1,2,3,4, 1,2,3,4, . . . }, and a value of indication information of at least one time unit in a time unit subset corresponding to a second frequency domain unit may be counted as {1,2,3,4, 1,2,3,4, . . . }. This is not limited in this application. It should be noted that the number of bits in a DAI field is usually 2. Therefore, there are only four states: '00', '01', '10', and '11', and corresponding values may be 1, 2, 3, and 4, respectively, or 0, 1, 2, and 3, respectively. That the values are 1, 2, 3, and 4 is used as an example. If a value exceeds 4, cyclic counting may be performed. For example, the foregoing counts {1,2,3,4, 1,2,3,4, . . . } are actual counts {1,2,3,4, 5,6,7,8, . . . }.

For another example, the preset rule may be that a time unit 1 corresponding to a frequency domain unit 1 is identified as 1, a time unit 1 corresponding to a frequency domain unit 2 is identified as 2, a time unit 1 corresponding to a frequency domain unit 3 is identified as 3, and so on. Then, a time unit 2 corresponding to the frequency domain unit 1 is identified as 4, a time unit 2 corresponding to the frequency domain unit 2 is identified as 5, a time unit 2 corresponding to the frequency domain unit 3 is identified as 6, and so on. In other words, the preset rule is performing cumulative counting first in a frequency-domain order and then in a time-domain order.

Optionally, the at least one piece of downlink information further includes second downlink information, where a downlink control channel for scheduling the second downlink information is a downlink control channel for semi-persistent scheduling, and the first codebook further includes feedback information corresponding to the second downlink information.

Optionally, the first association relationship is predefined according to a standard and/or configured for the terminal device by a network device by using RRC signaling.

Optionally, the second association relationship is determined based on the downlink control channel for dynamic scheduling.

Optionally, a time unit may be at least one of a slot, a mini-slot, and a subframe.

Optionally, a frequency domain unit may be a carrier or a carrier BWP.

Optionally, the second time unit may be an uplink time unit or a flexible time unit.

Optionally, the first association relationship may be preconfigured, or notified to the terminal device by using RRC dedicated signaling. Generally, for fallback PDCCH scheduling, the first association relationship may be preconfigured. For non-fallback PDCCH scheduling, the first association relationship may be notified to the terminal device by using RRC dedicated signaling.

Optionally, in this embodiment of this application, the downlink control channel may be a control channel for fallback scheduling.

Optionally, the indication information included on the downlink control channel for dynamically scheduling the first downlink information may be a DAI field, and the preset value is preferably DAI=1 or a value indicated by a state '00' of the DAI field.

Optionally, in this embodiment of this application, the at least one piece of downlink information may further include second downlink information, where a downlink control channel for scheduling the second downlink information is a downlink control channel for semi-persistent scheduling, and the first codebook further includes feedback information corresponding to the second downlink information.

Optionally, in this embodiment of this application, before the terminal device determines the first codebook, the terminal device determines a semi-persistent codebook mode from a plurality of candidate codebook modes, where the plurality of candidate codebook modes include a semi-persistent codebook mode and a dynamic codebook mode.

Optionally, in this embodiment of this application, before the terminal device sends the feedback information in the second time unit based on the first codebook, the terminal device determines a target resource set of an uplink control channel, and determines a target resource of the uplink control channel from the target resource set. The terminal device sends the uplink control information on the target resource in the second time unit, where the uplink control information carries the first codebook.

For example, when the number of pieces of the first downlink information in the at least one piece of downlink information is equal to the first preset value (for example, the first preset value is 1) or when the foregoing other conditions are met, that is, the first codebook in this case is a fallback codebook, the target resource set is a first resource set, and a codebook size of the first codebook corresponding to the first resource set is less than or equal to 2.

In other words, when the number of pieces of the first downlink information, which may be the number of PDSCHs, meets the first condition included in the preset condition, for example, when the first preset value is 1, that is, the terminal device detects a PDCCH for one scheduled PDSCH, the terminal device may perform codebook fallback. In this case, the terminal device sends the first codebook of the feedback information on a first target resource in the first resource set.

Optionally, in this embodiment of this application, when the number of pieces of the first downlink information in the at least one piece of downlink information is not the first preset value, the target resource set is a second resource set, and a codebook size of the first codebook corresponding to the second resource set is greater than 2. In this case, the first codebook is a non-fallback codebook or a normal semi-persistent codebook. In this case, the terminal device sends the first codebook of the feedback information on a second target resource in the second resource set.

It should be understood that in this embodiment of this application, the first downlink information may alternatively be dynamically scheduled downlink information.

For example, the first downlink information may include downlink SPS release indication or a dynamically scheduled downlink data channel, where a dynamically scheduled downlink data channel may be dynamically scheduled through a downlink control channel.

It should be noted that dynamic scheduling means that each transmission of a downlink data channel needs to be scheduled through a corresponding downlink control channel.

A dynamically scheduled downlink data channel corresponds to a semi-persistently scheduled downlink data channel that is scheduled through a semi-persistent downlink control channel. To be specific, after a semi-persistent downlink control channel is sent once, a corresponding semi-persistent downlink data channel may be always sent according to a preconfigured sending cycle, with no need to send the semi-persistent downlink control channel each time.

Semi-persistent downlink scheduling may be released through a specific downlink control channel. A downlink control channel used to implement release indication of the semi-persistent downlink scheduling is usually not used to schedule a downlink data channel. However, the terminal device also needs to feed back ACK/NACK feedback information for the downlink control channel.

It should be understood that in this embodiment of this application, a dynamically scheduled downlink data channel may alternatively be used as an example for describing downlink information. This is not limited in this application.

Optionally, in this embodiment of this application, in the dynamic codebook mode, the terminal device may determine a second codebook of feedback information, where the second codebook includes feedback information corresponding to an actually scheduled first time unit in the time unit set.

It should be understood that although not shown, the communication device 700 may further include another unit, such as an input unit and an output unit.

Figure 9:
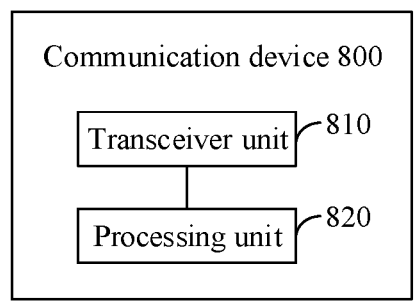
FIG. 9 is a schematic diagram of a communication device according to an embodiment of this application.

FIG. 9 is a structural block diagram of a communication device 800 according to an embodiment of this application. The communication device 800 may be a network device applied to the system shown in FIG. 1. The communication device 800 shown in FIG. 9 includes a transceiver unit 810 and a processing unit 820.

The transceiver unit 810 and the processing unit 820 communicate with each other through an internal connection channel, to transfer a control signal and/or a data signal. In a possible design, the transceiver unit 810 and the processing unit 820 may be implemented by using a chip, to implement corresponding functions of a network device in this embodiment of this application.

In this embodiment of this application, the transceiver unit 810 is configured to:
  send at least one piece of downlink information to a terminal device in at least one first time unit in a time unit set, where the time unit set is a set of at least one first time unit corresponding to at least one frequency domain unit configured for the terminal device.
The processing unit 820 is configured to:
determine a second time unit, where the second time unit is used to carry feedback information corresponding to the at least one piece of downlink information, and there is a first association relationship between the time unit set and the second time unit.
The transceiver unit 810 is configured to:
receive, in the second time unit, uplink control information sent by the terminal device, where the uplink control information carries a first codebook, the first codebook is a first codebook when first downlink information in a time unit subset meets a preset condition, the first codebook includes feedback information corresponding to the first downlink information, the first codebook does not include feedback information corresponding to a specific time unit in the time unit subset, the specific time unit is at least one first time unit in the time unit set other than a first time unit in which the first downlink information is located, the preset condition includes a first condition, the first condition is that the number of pieces of first downlink information is equal to a first preset value, the time unit subset is a subset of the time unit set, and there is a second association relationship between the time unit subset and the second time unit.

Optionally, the processing unit 820 is further configured to:
  determine a semi-persistent codebook mode from a plurality of candidate codebook modes, where the plurality of candidate codebook modes include a semi-persistent codebook mode and a dynamic codebook mode; and
The transceiver unit 810 is further configured to:
  configure the semi-persistent codebook mode for the terminal device by using signaling.

Optionally, the preset condition further includes a second condition, and the second condition is that a value of indication information on a downlink control channel for dynamically scheduling the first downlink information is a second preset value.

Optionally, the preset condition further includes a third condition, and the third condition is that the first time unit in which the first downlink information is located is a first time unit in a specific time domain location in the time unit set.

Optionally, the preset condition further includes a fourth condition, and the fourth condition is that the first downlink information is carried in a primary frequency domain unit or a first secondary frequency domain unit in the at least one frequency domain unit.

Optionally, in this embodiment of this application, the preset condition may alternatively include both the second condition and the third condition. In other words, the value of the indication information on the downlink control channel for dynamically scheduling the first downlink information is the second preset value, and the first time unit in which the first downlink information is located is the first time unit in the specific time domain location in the time unit set. In this case, based on the second preset value and the first time unit in the specific time domain location, consistency of downlink slot understanding between the terminal device and a base station during codebook fallback is improved.

It should be understood that in this embodiment of this application, the preset condition may further include any one or more of the second condition, the third condition, and the fourth condition in addition to the first condition. For example, the preset condition further includes the second condition and the third condition in addition to the first condition. Alternatively, the preset condition further includes the second condition and the fourth condition in addition to the first condition. This is not limited in this application.

Optionally, when the number of pieces of the first downlink information in the time unit subset does not meet the first condition, the first codebook includes feedback information corresponding to all first time units in the time unit set.

Optionally, the value of the indication information is set according to a predefined rule related to the time unit subset.

Optionally, for at least one first time unit that corresponds to each of the at least one frequency domain unit and that is in the first time unit subset, the predefined rule is performing cumulative counting in a sequential order of time units; or
  for at least one first time unit that corresponds to the at least one frequency domain unit and that is in the first time unit subset, the predefined rule is performing cumulative counting first in a frequency-domain order and then in a time-domain order.

For example, the preset rule may be that a value of indication information of at least one time unit in a time unit subset corresponding to a first frequency domain unit may be counted as {1,2,3,4, 1,2,3,4, . . . }, and a value of indication information of at least one time unit in a time unit subset corresponding to a second frequency domain unit may be counted as {1,2,3,4, 1,2,3,4, . . . }. This is not limited in this application. It should be noted that the number of bits in a DAI field is usually 2. Therefore, there are only four states: '00', '01', '10', and '11', and corresponding values may be 1, 2, 3, and 4, respectively, or 0, 1, 2, and 3, respectively. That the values are 1, 2, 3, and 4 is used as an example. If a value exceeds 4, cyclic counting may be performed. For example, the foregoing counts {1,2,3,4, 1,2,3,4, . . . } are actual counts {1,2,3,4, 5,6,7,8, . . . }.

For another example, the preset rule may be that a time unit 1 corresponding to a frequency domain unit 1 is identified as 1, a time unit 1 corresponding to a frequency domain unit 2 is identified as 2, a time unit 1 corresponding to a frequency domain unit 3 is identified as 3, and so on. Then, a time unit 2 corresponding to the frequency domain unit 1 is identified as 4, a time unit 2 corresponding to the frequency domain unit 2 is identified as 5, a time unit 2 corresponding to the frequency domain unit 3 is identified as 6, and so on. In other words, the preset rule is performing cumulative counting first in a frequency-domain order and then in a time-domain order.

Optionally, the at least one piece of downlink information further includes second downlink information, where a downlink control channel for scheduling the second downlink information is a downlink control channel for semi-persistent scheduling, and the first codebook further includes feedback information corresponding to the second downlink information.

Optionally, the first association relationship is predefined according to a standard and/or configured for the terminal device by a network device by using RRC signaling.

Optionally, the second association relationship is indicated by the downlink control channel for dynamically scheduling the first downlink information.

Optionally, a time unit may be at least one of a slot, a mini-slot, and a subframe.

Optionally, a frequency domain unit may be a carrier or a carrier BWP.

Optionally, the second time unit may be an uplink time unit or a flexible time unit.

Optionally, the first association relationship may be preconfigured, or notified to the terminal device by using RRC dedicated signaling. Generally, for fallback PDCCH scheduling, the first association relationship may be preconfigured. For non-fallback PDCCH scheduling, the first association relationship may be notified to the terminal device by using RRC dedicated signaling.

Optionally, in this embodiment of this application, the downlink control channel may be a control channel for fallback scheduling.

Optionally, the indication information included on the downlink control channel for dynamically scheduling the first downlink information may be a DAI field, and the preset value is preferably DAI=1 or a value indicated by a state '00' of the DAI field.

Optionally, in this embodiment of this application, the at least one piece of downlink information may further include second downlink information, where a downlink control channel for scheduling the second downlink information is a downlink control channel for semi-persistent scheduling, and the first codebook further includes feedback information corresponding to the second downlink information.

It should be understood that in this embodiment of this application, the first downlink information may alternatively be dynamically scheduled downlink information.

For example, the first downlink information may include downlink SPS release indication or a dynamically scheduled downlink data channel, where a dynamically scheduled downlink data channel may be dynamically scheduled through a downlink control channel.

It should be noted that dynamic scheduling means that each transmission of a downlink data channel needs to be scheduled through a corresponding downlink control channel.

The dynamically scheduled downlink data channel corresponds to a semi-persistently scheduled downlink data channel that is scheduled through a semi-persistent downlink control channel. To be specific, after a semi-persistent downlink control channel is sent once, a corresponding semi-persistent downlink data channel may be always sent according to a preconfigured sending cycle, with no need to send the semi-persistent downlink control channel each time.

Semi-persistent downlink scheduling may be released through a specific downlink control channel. A downlink control channel used to implement release indication of the semi-persistent downlink scheduling is usually not used to schedule a downlink data channel. However, the terminal device also needs to feed back ACK/NACK feedback information for the downlink control channel.

It should be understood that in this embodiment of this application, a dynamically scheduled downlink data channel may alternatively be used as an example for describing downlink information. This is not limited in this application.

Optionally, in this embodiment of this application, in the dynamic codebook mode, the terminal device may determine a second codebook of feedback information, where the second codebook includes feedback information corresponding to an actually scheduled first time unit in the time unit set.

It should be understood that although not shown, the communication device 800 may further include another unit, such as an input unit and an output unit.

Figure 10:
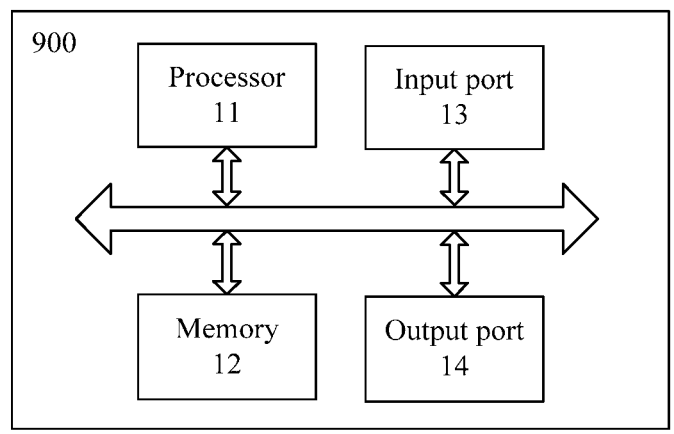
FIG. 10 is a schematic block diagram of a communication device according to another embodiment of this application.

FIG. 10 is a schematic block diagram of a communication device 900 according to another embodiment of this application. As shown in FIG. 10, the communication device 900 may be a terminal device, or may be a chip or a circuit, for example, a chip or a circuit that may be disposed in a terminal device. The terminal device may correspond to the terminal device in the foregoing method.

The communication device 900 may include a processor 11 (which may be the processing unit 720) and a memory 12. The memory 12 is configured to store an instruction, and the processor 11 is configured to execute the instruction stored in the memory 12, so that the communication device 900 implements the steps performed by the terminal device in the method corresponding to FIG. 4.

The communication device 900 may further include an input port 13 (which may be the transceiver unit 710) and an output port 14 (which may be the transceiver unit 710). Further, the processor 11, the memory 12, the input port 13, and the output port 14 may communicate with each other through an internal connection path, to transfer a control signal and/or a data signal. The memory 12 is configured to store a computer program, and the processor 11 may be configured to invoke and run the computer program in the memory 12. The memory 12 may be integrated into the processor 11, or may be disposed separately from the processor 11.

Optionally, if the communication device 900 is a terminal device, the input port 13 is a receiver, and the output port 14 is a transmitter. The receiver and the transmitter may be one physical entity or different physical entities. When being one physical entity, the receiver and the transmitter may be collectively referred to as a transceiver.

Optionally, if the communication device 900 is a chip or a circuit, the input port 13 is an input interface, and the output port 14 is an output interface.

In an implementation, functions of the input port 13 and the output port 14 may be implemented by using a transceiver circuit or a special-purpose transceiver chip. The processor 11 may be implemented by using a special-purpose processing chip, a processing circuit, a processor, or a general-purpose chip.

In another implementation, the terminal device provided in this embodiment of this application may be implemented by using a general-purpose computer. To be specific, program code for implementing functions of the processor 11, the input port 13, and the output port 14 is stored in the memory 12, and the general-purpose processor executes the code in the memory 12 to implement the functions of the processor 11, the input port 13, and the output port 14.

The processor is mainly configured to process a communication protocol and communication data, control the entire terminal device, execute a software program, and process data of the software program, for example, configured to perform codebook fallback for a first codebook when first downlink information in a time unit subset meets a preset condition. The memory is mainly configured to store a software program and data, for example, store the first codebook described in the foregoing embodiments.

For ease of description, FIG. 10 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data, and the central processing unit is mainly configured to control the entire terminal device, execute a software program, and process data of the software program.

Functions of the baseband processor and the central processing unit are integrated into the processor in FIG. 10. The baseband processor and the central processing unit may alternatively be independent processors connected to each other by using technologies such as a bus.

The terminal device may include a plurality of baseband processors to adapt to different network standards, the terminal device may include a plurality of central processing units to enhance a processing capability of the terminal device, and components of the terminal device may be connected to each other by using various buses. The baseband processor may alternatively be expressed as a baseband processing circuit or a baseband processing chip. The central processing unit may alternatively be expressed as a central processing circuit or a central processing chip. A function of processing a communication protocol and communication data may be built into the processor, or may be stored in a storage unit in a form of a software program. The processor executes the software program to implement a baseband processing function.

For example, in this embodiment of this application, an antenna having sending and receiving functions and a control circuit may be considered as the transceiver unit 710 of the communication device 700, and a processor having a processing function may be considered as the processing unit 720 of the communication device 700. As shown in FIG. 8, the communication device 700 includes the transceiver unit 710 and the processing unit 720. The transceiver unit may alternatively be referred to as a transceiver, a transceiver communication device, or the like. Optionally, a component, configured to implement a receiving function, in the transceiver unit 710 may be considered as a receiving unit, and a component, configured to implement a sending function, in the transceiver unit 710 may be considered as a sending unit. In other words, the transceiver unit 710 includes a receiving unit and a sending unit. For example, the receiving unit may also be referred to as a receiver, a receiver circuit, or the like, and the sending unit may be referred to as a transmitter, a transmit circuit, or the like.

Figure 11:
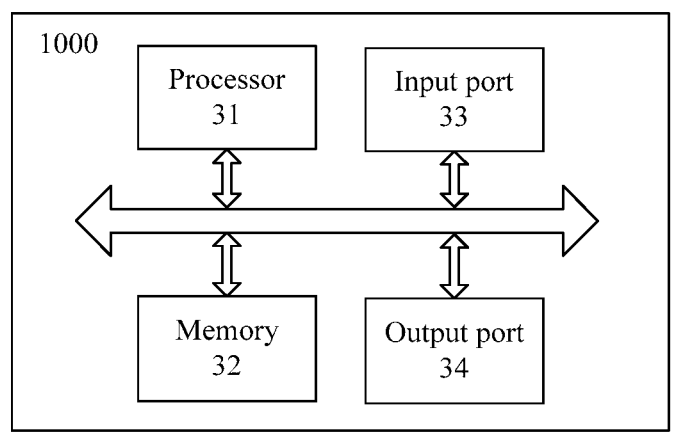
FIG. 11 is a schematic block diagram of a communication device according to another embodiment of this application.

FIG. 11 is a schematic block diagram of a communication device 1000 according to another embodiment of this application. As shown in FIG. 11, the communication device 1000 may be a network device, or may be a chip or a circuit, for example, a chip or a circuit that may be disposed in a network device. The network device corresponds to the network device in the foregoing method.

The communication device 1000 may include a processor 31 (which may be the processing unit 820) and a memory 32. The memory 32 is configured to store an instruction, and the processor 31 is configured to execute the instruction stored in the memory 32, so that the communication device 1000 implements a step performed by the network device in the method corresponding to FIG. 4.

The communication device 1000 may further include an input port 33 (which may be the transceiver unit 810) and an output port 33 (which may be the transceiver unit 810). Still further, the processor 31, the memory 32, the input port 33, and the output port 34 may communicate with each other through an internal connection path, to transfer a control signal and/or a data signal. The memory 32 is configured to store a computer program, and the processor 31 may be configured to invoke and run the computer program in the memory 32, so as to control the input port 33 to receive a signal and control the output port 34 to send the signal, to complete the step performed by the network device in the method in FIG. 4. The memory 32 may be integrated into the processor 31, or may be disposed separately from the processor 31.

The processor 31 controls the input port 33 to receive a signal and controls the output port 34 to send the signal, to complete the step performed by the network device in the foregoing method. The memory 32 may be integrated into the processor 31, or may be disposed separately from the processor 31.

Optionally, if the communication device 1000 is a network device, the input port 33 is a receiver, and the output port 34 is a transmitter. The receiver and the transmitter may be one physical entity or different physical entities. When being one physical entity, the receiver and the transmitter may be collectively referred to as a transceiver.

Optionally, if the communication device 1000 is a chip or a circuit, the input port 33 is an input interface, and the output port 34 is an output interface.

Optionally, if the communication device 1000 is a chip or a circuit, alternatively, the communication device 1000 may not include the memory 32, and the processor 31 may read an instruction (a program or code) from a memory outside the chip, to implement functions of the network device in the foregoing method corresponding to FIG. 4.

In an implementation, functions of the input port 33 and the output port 34 may be implemented by using a transceiver circuit or a special-purpose transceiver chip. The processor 31 may be implemented by using a special-purpose processing chip, a processing circuit, a processor, or a general-purpose chip.

In another implementation, the device provided in this embodiment of this application may be implemented by using a general-purpose computer. To be specific, program code for implementing functions of the processor 31, the input port 33, and the output port 34 is stored in the memory 32, and the general-purpose processor executes the code in the memory to implement the functions of the processor 31, the input port 33, and the output port 34.

In this embodiment of this application, FIG. 11 may be a schematic structural diagram of a network device that can be configured to implement the functions of the network device in the foregoing method. The processor 31 may implement functions of the processing unit 820 in the communication device 800, and the input port 33 and the output port 34 may implement functions of the transceiver unit 810 in the communication device 800. This is not limited in this application.

The feedback information transmission method in the foregoing embodiment of this application may be applied to the processor, or may be implemented by the processor. The processor may be an integrated circuit chip and has a signal processing capability. In an implementation process, steps in the foregoing methods can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing circuit (DSP), a micro controller unit (MCU), a programmable logic device (PLD), or another integrated chip. The processor may implement or perform the methods, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads instructions in the memory and completes the steps in the foregoing methods in combination with hardware of the processor.

It can be understood that when the embodiments of this application are applied to a chip in a network device, the chip in the network device implements functions of the network device in the foregoing method embodiments. The chip in the network device receives an uplink shared channel and the uplink data from another module (for example, a radio frequency module or an antenna) in the network device. The uplink shared channel and the uplink data are sent by a terminal device to a base station.

When the embodiments of this application are applied to a chip in a terminal device, the chip in the terminal device implements functions of the terminal device in the foregoing method embodiments. The chip in the terminal device sends the uplink control information from another module (for example, a radio frequency module or an antenna) in the terminal device, where the uplink control information carries the first codebook.

All or some of the foregoing embodiments may be implemented through software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or another programmable communication device. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired manner or through an infrared, radio, or microwave manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A different method may be used to implement the described functions for each particular application, but it should not be considered that the implementation goes beyond the scope of this application.

For convenient and brief description, for a detailed working process of the foregoing system, communication device, or unit, reference may be made to a corresponding process in the foregoing method embodiments, and no more details are described herein again.

In the several embodiments provided in this application, it should be understood that the disclosed system, communication device, and method may be implemented in other manners. For example, the described communication device embodiments are merely examples. For example, the unit division is merely logical function division and may be other division in actual implementation. For example, a plurality of units or components may be combined or integrated into another system, or some features may be ignored or may be not performed. In addition, the displayed or discussed mutual couplings or direct couplings or communication connections may be indirect couplings or communication connections through some interfaces, communication devices, or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or an apparatus) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement that can be readily figured out within the technical scope disclosed in this application shall fall within the protection scope of this application. Therefore, the protection scope of this application shall be subject to the protection scope of the claims.

The invention claimed is:

1. A method applied for a terminal device or a chip for a terminal device, the method comprising:
   receiving, from a network device, timing indication information carried in physical downlink control channel (PDCCH) scheduling first physical downlink shared channels (PDSCHs),
      wherein the timing indication information indicates a timing offset between first time units for carrying the first PDSCHs and a second time unit for carrying feedback information for the first PDSCHs;
   receiving PDSCHs in time units in a time unit set,
      wherein the PDSCHs comprise the first PDSCHs,
      wherein the first time unit belongs to the time unit set, and
      wherein there is a first association relationship between the time unit set and the second time unit; and
   sending uplink control information including a first codebook in the second time unit,
      wherein based on meeting a preset condition comprising a first condition, the first codebook comprises only the feedback information for the first PDSCHs, and
      wherein the first condition comprises a number of the received PDSCHs in time units in the time unit set being greater than 1,
      wherein the received PDSCHs in the time units in the time unit set only comprise the first PDSCHs, and
      wherein the first PDSCHs carry the same transport block information.

2. The method according to claim 1, wherein the preset condition further comprises a second condition, and the second condition is that a value of downlink assignment indicator (DAI) for dynamically scheduling the first PDSCHs is 1.

3. The method according to claim 1, wherein the preset condition further comprises a third condition, and the third condition is that the first PDSCHs are carried in a primary cell or a first secondary cell in one or more cells configured for the terminal device.

4. The method according to claim 1, wherein in a case of the first condition not being met, the first codebook includes feedback information for all PDSCHs in the time units in the time unit set.

5. The method according to claim 1, wherein the first association relationship is predefined; or the first association relationship is configured by the network device via radio resource control (RRC) signaling.

6. The method according to claim 1, further comprising:
   determining, from a plurality of candidate codebook modes, the mode of the first codebook as a semi-persistent codebook mode, wherein the plurality of candidate codebook modes comprise the semi-persistent codebook mode and a dynamic codebook mode.

7. A communication apparatus comprising:
   at least one processor coupled to one or more memories storing programming instructions for execution by the at least one processor to perform operations comprising:
      receiving, from a network device, timing indication information carried in physical downlink control channel (PDCCH) scheduling first physical downlink shared channels (PDSCHs),
         wherein the timing indication information indicates a timing offset between first time units for carrying the first PDSCHs and a second time unit for carrying feedback information for the first PDSCHs;
      receiving PDSCHs in time units in a time unit set,
         wherein the PDSCHs comprise the first PDSCHs,
         wherein the first time units belong to the time unit set, and
         wherein there is a first association relationship between the time unit set and the second time unit;
      sending uplink control information including a first codebook in the second time unit,
         wherein based on meeting a preset condition comprising a first condition, the first codebook comprises only the feedback information for the first PDSCHs, and
         wherein the first condition comprises a number of the received PDSCHs in time units in the time unit set being greater than 1,
         wherein the received PDSCH in time units in the time unit set only comprises the first PDSCHs, and
         wherein the first PDSCHs carry the same transport block information.

8. The apparatus according to claim 7, wherein the preset condition further comprises a second condition, and the second condition is that a value of downlink assignment indicator (DAI) for dynamically scheduling the first PDSCHs is 1.

9. The apparatus according to claim 7, wherein the preset condition further comprises a third condition, and the third condition is that the PDSCHs are carried in a primary cell or a first secondary cell in one or more cells configured for the apparatus.

10. The apparatus according to claim 7, wherein in a case of the first condition not being met, the first codebook includes feedback information for all of the PDSCHs in the time units in the time unit set.

11. The apparatus according to claim 7, wherein the first association relationship is predefined; or the first association relationship is configured by the network device via radio resource control (RRC) signaling.

12. The apparatus according to claim 7, wherein the operations further comprises:
 determining, from a plurality of candidate codebook modes, the mode of the first codebook as a semi-persistent codebook mode, wherein the plurality of candidate codebook modes comprise the semi-persistent codebook mode and a dynamic codebook mode.

13. A communication apparatus comprising:
 at least one processor coupled to one or more memories storing programming instructions for execution by the at least one processor to perform operations comprising:
 sending timing indication information carried in physical downlink control channel (PDCCH) scheduling first physical downlink shared channels (PDSCHs),
 wherein the timing indication information indicates a timing offset between first time units for carrying the first PDSCHs and a second time unit for carrying feedback information for the first PDSCHs;
 sending PDSCHs in time units in a time unit set to a terminal device,
 wherein the PDSCHs comprise the first PDSCHs,
 wherein the first time units belong to the time unit set, and
 wherein there is a first association relationship between the time unit set and the second time unit; and
 receiving, in the second time unit, uplink control information from the terminal device, wherein the uplink control information includes a first codebook,
 wherein, based on meeting a preset condition comprising a first condition, the first codebook comprises only the feedback information for the first PDSCHs, and
 wherein the first condition comprises a number of the sent PDSCHs in time units in the time unit set being greater than 1,
 wherein the sent PDSCHs in time units in the time unit set only comprises the first PDSCHs, and
 wherein the first PDSCHs carry same transport block information.

14. The apparatus according to claim 13, wherein the preset condition further comprises a second condition, and the second condition is that a value of downlink assignment indicator (DAI) for dynamically scheduling first PDSCHs.

15. The apparatus according to claim 13, wherein the preset condition further comprises a third condition, and the third condition is that the first PDSCHs are carried in a primary cell or a first secondary cell in one or more cells configured for the terminal device.

16. The apparatus according to claim 13, wherein in a case of the first condition not being met, the first codebook includes feedback information for all PDSCHs in time units in the time unit set.

17. The apparatus according to claim 13, wherein the first association relationship is predefined; or the first association relationship is configured by the network device via radio resource control (RRC) signaling.

* * * * *